United States Patent
Lee et al.

(10) Patent No.: US 12,316,900 B2
(45) Date of Patent: May 27, 2025

(54) CONTROL APPARATUS AND OPERATING METHOD THEREOF

(71) Applicant: SAMSUNG ELECTRONICS CO., LTD., Suwon-si (KR)

(72) Inventors: Wonjae Lee, Suwon-si (KR); Hyunkyu Yun, Suwon-si (KR); Minsup Kim, Suwon-si (KR); Seungil Yoon, Suwon-si (KR); Eunseok Choi, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 53 days.

(21) Appl. No.: 17/551,927

(22) Filed: Dec. 15, 2021

(65) Prior Publication Data
US 2022/0182703 A1   Jun. 9, 2022

Related U.S. Application Data

(63) Continuation of application No. PCT/KR2021/017639, filed on Nov. 26, 2021.

(30) Foreign Application Priority Data

Dec. 4, 2020   (KR) .................. 10-2020-0168721

(51) Int. Cl.
*H04N 21/422* (2011.01)
*H04N 21/443* (2011.01)

(52) U.S. Cl.
CPC ... *H04N 21/42212* (2013.01); *H04N 21/4221* (2013.01); *H04N 21/4436* (2013.01)

(58) Field of Classification Search
None
See application file for complete search history.

(56) References Cited

U.S. PATENT DOCUMENTS 6,115,079 A * 9/2000 McRae .............. H04N 21/4583
                                                            348/553
6,980,114 B2   12/2005 Kleinschmidt
(Continued)

FOREIGN PATENT DOCUMENTS

JP           5-347719 A    12/1993
JP      2005-136518 A     5/2005
(Continued)

OTHER PUBLICATIONS

International Communication (PCT/ISA/210, PCT/ISA/237 and PCT/ISA 220) dated Mar. 2, 2022 issued by the International Search Authority in International Application No. PCT/KR2021/017639.
(Continued)

*Primary Examiner* — John W Miller
*Assistant Examiner* — Sean N. Haiem
(74) *Attorney, Agent, or Firm* — Sughrue Mion, PLLC

(57) ABSTRACT

Provided is a control apparatus including a key input interface including a plurality of keys, a communication interface configured to communicate with an electronic device, a memory storing store one or more instructions, and a processor configured to execute the one or more instructions stored in the memory to detect whether a power of the electronic device is turned on or turned off, and control the control apparatus to operate in a first mode, based on detecting that the power of the electronic device is turned off, wherein the operating in the first mode includes operating a pre-determined first key from among the plurality of keys in an interrupt mode, and not operating a second key other than the first key from among the plurality of keys.

19 Claims, 14 Drawing Sheets

(56) References Cited

U.S. PATENT DOCUMENTS

| | | | | |
|---|---|---|---|---|
| 9,454,251 B1* | 9/2016 | Guihot | | G06F 3/041 |
| 2004/0227857 A1* | 11/2004 | Mizushima | | G08C 19/28 |
| | | | | 348/E5.103 |
| 2009/0122206 A1 | 5/2009 | Jung | | |
| 2009/0202250 A1* | 8/2009 | Dizechi | | G08C 23/04 |
| | | | | 398/107 |
| 2009/0249086 A1 | 10/2009 | Reams | | |
| 2010/0003016 A1* | 1/2010 | Ishimaru | | H04N 5/772 |
| | | | | 348/E5.042 |
| 2010/0222031 A1* | 9/2010 | Carolan | | G08C 17/02 |
| | | | | 455/414.1 |
| 2011/0164189 A1* | 7/2011 | Asayama | | G08C 17/00 |
| | | | | 348/734 |
| 2014/0139750 A1* | 5/2014 | Waites | | H04N 21/41265 |
| | | | | 348/734 |
| 2016/0005404 A1* | 1/2016 | Yokoya | | H04N 21/42203 |
| | | | | 704/275 |
| 2017/0011624 A1* | 1/2017 | Guihot | | G06F 3/041 |
| 2017/0111871 A1* | 4/2017 | Lee | | H04B 17/00 |
| 2018/0091845 A1* | 3/2018 | Lee | | H04L 45/74 |
| 2018/0143838 A1* | 5/2018 | Seo | | G06F 9/442 |
| 2019/0190765 A1* | 6/2019 | Murali | | H04W 52/0245 |
| 2020/0359318 A1* | 11/2020 | Lu | | H04W 52/0216 |
| 2021/0096660 A1* | 4/2021 | Xie | | G06F 3/04162 |

FOREIGN PATENT DOCUMENTS

| | | |
|---|---|---|
| JP | 2007-300251 A | 11/2007 |
| JP | 2008-54213 A | 3/2008 |
| JP | 2008-135917 A | 6/2008 |
| JP | 2012-138853 A | 7/2012 |
| KR | 10-0425138 B1 | 3/2004 |
| KR | 10-0856114 B1 | 9/2008 |
| KR | 10-2009-0074634 A | 7/2009 |

OTHER PUBLICATIONS

Extended European Search Report dated Feb. 2, 2024 in European Application No. 21900936.2.

* cited by examiner

FIG. 1
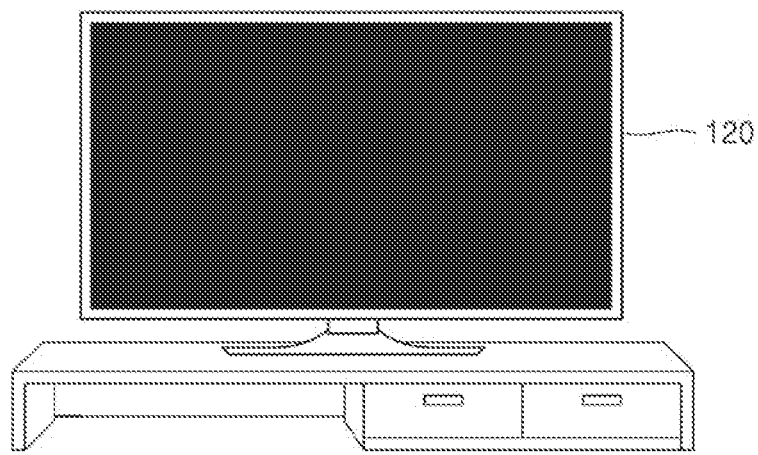
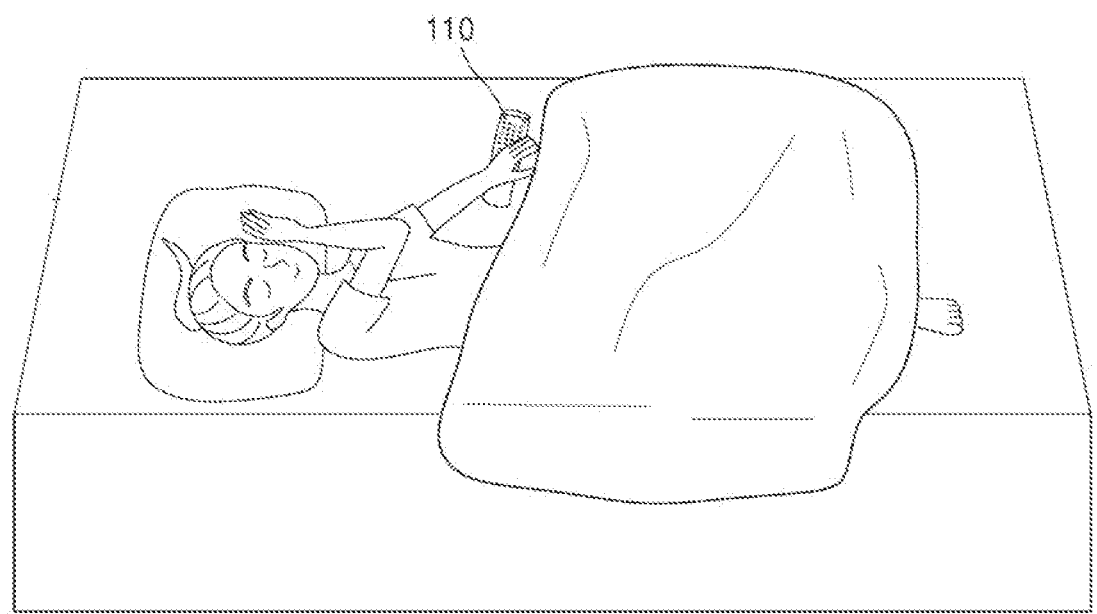

CONTROL APPARATUS AND OPERATING METHOD THEREOF

CROSS-REFERENCE TO RELATED APPLICATIONS

This application is a by-pass continuation of International Application No. PCT/KR2021/017639, filed on Nov. 26, 2021, which based on and claims priority to Korean Patent Application No. 10-2020-0168721, filed on Dec. 4, 2020, the disclosures of which are incorporated by reference herein in their entireties.

BACKGROUND

The disclosure relates to a control apparatus and an operating method thereof, and more particularly, to a control apparatus and an operating method thereof which prevent unnecessary power consumption by not performing an operation according to a key input according to a state of an electronic device.

A user may control an operation of an electronic device such as an image display apparatus, an audio device, or a digital versatile disk (DVD) by using a control apparatus such as a remote controller. When the user selects one of a plurality of keys included in the remote controller, the remote controller may generate a signal corresponding to a selected key input and may transmit the signal to the electronic device. The electronic device may perform an operation according to the key input according to the signal received from the remote controller.

However, there may be cases where the electronic device is unable to perform the operation according to the key input of the remote controller. Even in this case, when the key is input, the remote controller transmits the signal corresponding to the input key to the electronic device, thereby unnecessarily consuming power.

SUMMARY

Provided are a control apparatus and an operating method thereof which operate in different modes according to whether power of an electronic device is turned on or off.

Provided are a control apparatus and an operating method thereof which cause or control only a certain key to operate in an interrupt method and the remaining keys not to operate, when power of an electronic device is turned off.

Provided are a control apparatus and an operating method thereof which perform or do not perform an operation according to a key input based on key information received from an electronic device, when power of the electronic device is turned on.

Provided are a control apparatus and an operating method thereof which operate in different modes according to whether power of an electronic device is turned on or off.

Provided are a control apparatus and an operating method thereof which control a certain key to operate in an interrupt method and the remaining keys not to operate, when power of an electronic device is turned off.

Provided are a control apparatus and an operating method thereof which perform or not perform an operation according to a key input based on key information received from an electronic device, when power of the electronic device is turned on.

According to an aspect of an example embodiment, there is provided a control apparatus including a key input interface including a plurality of keys, a communication interface configured to communicate with an electronic device, a memory storing store one or more instructions, and a processor configured to execute the one or more instructions stored in the memory to detect whether a power of the electronic device is turned on or turned off, and control the control apparatus to operate in a first mode, based on detecting that the power of the electronic device is turned off, wherein the operating in the first mode includes operating a pre-determined first key from among the plurality of keys in an interrupt mode, and not operating a second key other than the first key from among the plurality of keys.

The operating in the first mode may further include recognizing a key input of the first key and transmitting a control signal corresponding to the first key to the electronic device based on receiving the key input of the first key, and not recognizing a key input of the second key and not generating a control signal corresponding to the second key based on receiving the key input of the second key.

Each of the plurality of keys may be connected to a line of an input pin and a line of an output pin, wherein the operating in the first mode may further include controlling the output pin connected to the first key to output an output signal, and the input pin connected to the first key to detect the output signal in the interrupt mode based on receiving the key input of the first key, controlling the input pin connected to the first key to wake up when the output signal is detected in the interrupt method and to transmit the control signal corresponding to the first key to the electronic device through the communication interface, and controlling the input pin connected to the first key to operate in a sleep mode while the output signal is not detected in the interrupt method.

The processor may be further configured to execute the one or more instructions to, based on the first key being long-pressed, transmit the control signal corresponding to the first key to the electronic device once, and then operate in the sleep mode while the first key is long-pressed.

The processor may be further configured to execute the one or more instructions to, through the communication interface, detect that the power of the electronic device is turned off based on at least one of detecting that an interval at which a signal is received from the electronic device is longer than a reference value or receiving a signal indicating power-off from the electronic device.

The first key may include a power key.

The processor may be further configured to execute the one or more instructions to control the control apparatus to operate in a second mode based on detecting that the power of the electronic device is turned on, wherein the operating in the second mode may include, based on receiving key inputs of the plurality of keys, operating in a matrix method of recognizing the key inputs.

The processor may be further configured to execute the one or more instructions to, through the communication interface, detect that the power of the electronic device is turned on based on at least one of detecting that an interval at which a signal is received from the electronic device is equal to or shorter than a reference value or receiving a signal indicating power-on from the electronic device.

The operating in the second mode may further include controlling the communication interface to receive key information from the electronic device, based on identifying based on the key information that a key that is input is a key that does not operate, not performing an operation corresponding to the key input, and based on identifying based on the key information that a key that is input is a key that operates, transmitting a control signal corresponding to the key that is input to the electronic device through the communication interface, wherein the key information may correspond to a key for which a key input is received from a user from among the plurality of keys.

The not performing of the operation based on the key input when based on identifying that the key that is input is the key that does not operate may include at least one of not generating a control signal corresponding to the key, or not transmitting the control signal corresponding to the key to the electronic device through the communication interface.

The key information may be determined based on at least one of a setting state of the electronic device or an output screen state output by the electronic device.

The processor may be further configured to execute the one or more instructions to, based on a certain key from among the plurality of keys being long-pressed, based on identifying that the certain key is a key that operates, transmit a control signal corresponding to the certain key to the electronic device through the communication interface, and based on receiving key information indicating that the certain key is a key that does not operate from the electronic device while the certain key is long-pressed, not perform an operation corresponding to an input of the certain key while the certain key is long-pressed.

According to another aspect of an example embodiment, there is provided an electronic device including a communication interface configured to communicate with a control apparatus, a memory storing store one or more instructions, and a processor configured to execute the one or more instructions stored in the memory to, based on a power of the electronic device being turned on, determine a key that is unable to operate based on a control signal corresponding to a key input from among a plurality of keys included in the control apparatus based on at least one of a setting state of the electronic device or an output screen state currently output by the electronic device, and transmit key information corresponding to the determined key to the control apparatus through the communication interface.

According to another aspect of an example embodiment, there is provided an operating method of a control apparatus, the operating method including detecting whether a power of an electronic device controlled by the control apparatus is turned on or turned off, and operating in a first mode based on detecting that the power of the electronic device is turned off, wherein the operating in the first mode includes operating a pre-determined first key from among a plurality of keys included in the control apparatus in an interrupt method, and not operating a second key other than the first key from among the plurality of keys.

A computer-readable recording medium having recorded thereon a program for executing an operating method of a control apparatus, the operating method including detecting whether a power of an electronic device controlled by the control apparatus is turned on or turned off, and operating in a first mode based on detecting that the power of the electronic device is turned off, wherein the operating in the first mode includes operating a pre-determined first key from among a plurality of keys included in the control apparatus in an interrupt method, and not operating a second key other than the first key from among the plurality of keys.

The operating in the first mode may further include recognizing a key input of the first key and transmitting a control signal corresponding to the first key to the electronic device based on receiving the key input of the first key, and not recognizing a key input of the second key and not generating a control signal corresponding to the second key based on receiving the key input of the second key.

The operating in the first mode may further include controlling the output pin connected to the first key to output an output signal, and the input pin connected to the first key to detect the output signal in the interrupt mode based on receiving the key input of the first key, controlling the input pin connected to the first key to wake up when the output signal is detected in the interrupt method and to transmit the control signal corresponding to the first key to the electronic device, and controlling the input pin connected to the first key to operate in a sleep mode while the output signal is not detected in the interrupt method.

The operating method may further include operating in a second mode based on detecting that the power of the electronic device is turned on, wherein the operating in the second mode includes, based on receiving key inputs of the plurality of keys, operating in a matrix method of recognizing the key inputs.

The operating in the second mode may further include controlling the communication interface to receive key information from the electronic device, based on identifying based on the key information that a key that is input is a key that does not operate, not performing an operation corresponding to the key input, and based on identifying based on the key information that a key that is input is a key that operates, transmitting a control signal corresponding to the key that is input to the electronic device through the communication interface, wherein the key information may correspond to a key for which a key input is received from a user from among the plurality of keys.

The not performing of the operation based on the key input when based on identifying that the key that is input is the key that does not operate may include at least one of not generating a control signal corresponding to the key, or not transmitting the control signal corresponding to the key to the electronic device through the communication interface.

BRIEF DESCRIPTION OF DRAWINGS

FIG. 1 is a view illustrating a control apparatus operating when the power of an electronic device is turned off according to an embodiment;

DETAILED DESCRIPTION

Figure 2:
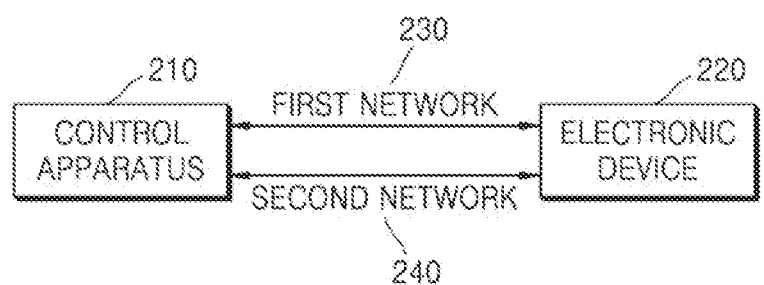
FIG. 2 is a diagram illustrating an electronic device and a control apparatus transmitting/receiving a signal through a network according to an embodiment.

Throughout the disclosure, the expression "at least one of a, b, or c" indicates only a, only b, only c, both a and b, both a and c, both b and c, all of a, b, and c, or variations thereof.

Hereinafter, embodiments will be described in detail with reference to the accompanying drawings so that the embodiments may be easily implemented by one of ordinary skill in the art. However, the disclosure may be embodied in many different forms and is not limited to the embodiments of the disclosure set forth herein.

In the disclosure, general terms that have been widely used nowadays are selected, in consideration of functions of the disclosure but various other terms may be selected according to the intentions of technicians in the art, precedents, new technologies, etc. Accordingly, the terms used herein should be defined not based on the names thereof but based on the meanings thereof and the whole context of the disclosure.

Also, the terms used herein are for the purpose of describing certain embodiments of the disclosure only and are not intended to be limiting of the disclosure.

Throughout the specification, when a component is referred to as being "connected" to another component, it will be understood to include that the component is "directly connected" to the other component or is "electrically connected" to the other component with another component therebetween.

In the specification and particularly in the claims, "the" and similar referents may be used to indicate both singular and plural forms. Also, when there is no description explicitly specifying an order of operations of a method according to the disclosure, the operations may be performed in an appropriate order. The disclosure is not limited to the order of the operations described.

The expressions "in some embodiments", "in an embodiment" and the like appearing in various parts of the specification are not necessarily referring to the same embodiment.

Some embodiments of the disclosure may be represented by functional block configurations and various operations. Some or all of functional blocks may be implemented by various numbers of hardware and/or software configurations for performing certain functions. For example, the functional blocks of the disclosure may be implemented by one or more microprocessors or by circuit configurations for a certain function. Also, for example, the functional blocks of the disclosure may be implemented in various programming or scripting languages. The functional blocks may be implemented in an algorithm executed by one or more processors. Also, in the disclosure, the prior art may be employed for electronic configuration, signal processing, and/or data processing. The terms "mechanism", "element", "means" and "configuration" may be used broadly and are not limited to mechanical and physical components.

Also, lines or members connecting elements illustrated in the drawings are merely illustrative of functional connections and/or physical or circuit connections. In an actual device, the connections between components may be represented by various functional connections, physical connections, or circuit connections that are replaceable or added.

Also, the terms such as "unit" or "module" refer to units that perform at least one function or operation, and the units may be implemented as hardware or software or as a combination of hardware and software.

Also, the term "user" used herein refers to a person which controls a function or operation of a control apparatus and/or an electronic device by using the control apparatus and/or the electronic device, and may include a viewer, a consumer, a manager, or an installation engineer.

Embodiments of the disclosure will be described in detail with reference to the attached drawings.

FIG. 1 is a view illustrating a control apparatus operating when power of an electronic device is turned off according to an embodiment.

In an embodiment, an electronic device 120 may be an image display apparatus. The electronic device 120 may be a digital television (TV) that may receive a digital broadcasting service, but embodiments are not limited thereto. The electronic device 120 may be any electronic device which may operate under the control of a control apparatus 110.

In an embodiment, the control apparatus 110 may be a device used to control the electronic device 120. A user may control various functions of the electronic device 120 by using the control apparatus 110.

In an embodiment, the control apparatus 110 may include a user interface. The user interface may receive a user input for controlling the electronic device 120.

In an embodiment, the user interface included in the control apparatus 110 may include an input unit or input interface for receiving the user input. In an embodiment, the input unit may include a plurality of keys. The keys may include a physical button for receiving a push operation, or a touch button displayed on a touchpad for sensing a touch.

The plurality of keys included in the control apparatus 110 may be used to control various functions of the electronic device 120.

The user may select a specific key from among the plurality of keys included in the control apparatus 110, to perform any of various functions of the electronic device 120, for example, a function of turning the power of the electronic device on/off, a function of changing a channel of the electronic device, a function of adjusting a volume of the electronic device, a function of selecting one of various broadcasting services of the electronic device such as a terrestrial broadcasting service, a cable broadcasting service, a satellite broadcasting service, or an Internet broadcasting service, a function of selecting an object of the electronic device such as a specific item or content on a screen, or a function of performing operations related to the settings of the electronic device.

When the user selects a specific key from among the plurality of keys provided in the control apparatus 110, the control apparatus 110 may obtain a key code instruction corresponding to the specific key selected by the user. The control apparatus 110 may control the electronic device 120 to perform a specific function according to the key code instruction by transmitting a signal including the key code instruction to the electronic device 120.

In an embodiment, the user interface included in the control apparatus 110 may further include a wheel for receiving a rotation operation of the user, a keyboard, a dome switch, a microphone for voice recognition, or a motion detection sensor for sensing a motion. In this case, the control apparatus 110 may receive an input from the user by using the wheel, the keyboard, the dome switch, the microphone, or the motion detection sensor, and may identify a key corresponding to the input.

For example, when the microphone for voice recognition is provided in the control apparatus 110, the control apparatus 110 may receive a voice command of the user through the microphone. When the user transmits a voice instruction "turn on power" to the control apparatus 110, the control apparatus 110 may identify a power-on key by analyzing the voice instruction of the user. The control apparatus 110 may transmit a signal including a code instruction corresponding to a power key to the electronic device 120.

There may be a case where a key included in the control apparatus 110 is selected against the user's intention. For example, when the electronic device 120 is in a power-off state, the electronic device 120 may not operate in response to a command other than a command to turn on power. That is, in a state where power of the electronic device 120 is turned off, even when the electronic device 120 receives a command for a specific key, for example, a volume up key or a channel down key, from the control apparatus 110, the electronic device 120 does not operate according to the command. Accordingly, even when the user continuously presses or selects a key other than a power key from among a plurality of keys included in the control apparatus 110, the electronic device 120 does not operate according to the input key. Nevertheless, when the user continuously presses a key that does not operate by mistake, the control apparatus 110 continuously generates a signal including a key code instruction corresponding to the key and transmits the signal to the electronic device 120, thereby unnecessarily consuming power.

In an embodiment, in order to prevent such unnecessary power consumption, the control apparatus 110 may operate in different modes according to whether power of the electronic device 120 is turned on or off.

In an embodiment, the control apparatus 110 may operate in a first mode when power of the electronic device 120 is turned off. In the first mode, from among the plurality of keys included in the control apparatus 110, only a first key may operate, and second keys other than the first key may not operate. In an embodiment, the first key is a key that operates even when power of the electronic device 120 is turned off, and one or a plurality of first keys may be provided. In an embodiment, the first key may include a power key.

For convenience of explanation, the following embodiment will be described assuming that the first key is a power key, but embodiments are not limited thereto.

In FIG. 1, in a state where power of the electronic device 120 is turned off, the user is sleeping while continuously pressing a specific key of the control apparatus 110. In this case, the specific key of the control apparatus 110 is continuously pressed against the user's intention.

In an embodiment, the control apparatus 110 may detect that the power of the electronic device 120 is turned off, and may accordingly operate in the first mode. In the first mode, the control apparatus 110 may control only the first key from among the plurality of keys to operate and the remaining keys not to operate.

In FIG. 1, when the key pressed by the user is a second key other than the first key, the control apparatus 110 may not perform an operation according to a second key input. In an embodiment, when an operation according to a second key input is not performed, it may indicate that even when the user selects the second key, a user input of the second key is not recognized. Accordingly, the control apparatus 110 may not generate a control signal corresponding to the second key selection.

In FIG. 1, when the key pressed by the user is the first key, the control apparatus 110 may generate a control signal including a key code instruction corresponding to the first key. The control apparatus 110 may transmit the control signal to the electronic device 120.

The user may provide input to a key included in the control apparatus 110 through long-pressing. In an embodiment, in the case that the user inputs the first key through long-pressing, after the control apparatus 110 transmits the control signal including the key code instruction corresponding to the first key to the electronic device 120 once, the control apparatus 110 may not continuously transmit the same control signal to the electronic device 120 again. That is, after the control apparatus 110 transmits a signal corresponding to the first key to the electronic device 120, the control apparatus 110 may not repeatedly transmit the same signal while the first key is pressed through long-pressing, thereby preventing unnecessary power consumption. After the input of the first key is released, the control apparatus 110 may not transmit the signal corresponding to the first key to the electronic device 120 until the first key is input again.

In an embodiment, when the first key is input through long-pressing and then the long-pressed input of the first key is released, the control apparatus 110 may transmit a release signal indicating the release to the electronic device 120, but embodiments are not limited thereto.

In an embodiment, there may be a case where, even when the control apparatus 110 transmits a signal corresponding to the first key to the electronic device 120, the electronic device 120 is unable to receive the signal corresponding to the first key from the control apparatus 110. For example, there may be cases where, because a power cord of the electronic device 120 is unplugged or due to an obstacle between the electronic device 120 and the control apparatus 110, the electronic device 120 is unable to receive a signal corresponding to the first key.

When the electronic device 120 is unable to receive the signal corresponding to the first key from the control apparatus 110, power of the electronic device 120 may continuously remain turned off. When the control apparatus 110 does not detect that the power of the electronic device 120 is turned on, the control apparatus 110 may continuously operate in the first mode.

In an embodiment, when the electronic device 120 receives a signal corresponding to the first key from the control apparatus 110, power of the electronic device 120 may be turned on according to a first key input. In an embodiment, when power of the electronic device 120 is turned on, the control apparatus 110 may detect that the power of the electronic device 120 is turned on. When the control apparatus 110 detects that the power of the electronic device 120 is turned on, the control apparatus 110 may change from the first mode to a second mode. The second mode may be an operation mode different from the first mode. Operating in the second mode may include causing the plurality of keys included in the control apparatus 120 to operate in a matrix method. In an embodiment, in the second mode, all keys that do not receive invalid key information from the electronic device 120 may operate.

As such, according to an embodiment, the control apparatus 110 may operate in different modes when power of the electronic device 120 is turned on and off.

According to an embodiment, when power of the electronic device 120 is turned off, the control apparatus 110 may operate in the first mode to not perform an operation according to an input of keys other than the first key.

According to an embodiment, when the control apparatus 110 operates in the first mode and the first key is input through long-pressing, the control apparatus 110 may transmit a signal corresponding to the first key to the electronic device 120 only once, thereby preventing unnecessary power consumption caused by continuously transmitting the same signal.

According to an embodiment, when power of the electronic device 120 is turned on, the control apparatus 110 may operate in the second mode different from the first mode.

FIG. 2 is a diagram illustrating an electronic device and a control apparatus transmitting/receiving a signal through a network, according to an embodiment of the disclosure.

Referring to FIG. 2, a control apparatus 210 and an electronic device 220 may be connected to each other by at least one of a first network 230 or a second network 240.

In an embodiment, the first network 230 and the second network 240 may be different communication methods. For example, each of the first network 230 and the second network 240 may include one of Bluetooth, Bluetooth low energy (BLE), near-field communication (NFC), infrared (IR) communication, radio frequency (RF) communication, Wi-Fi communication, and wired Ethernet.

For example, in an embodiment, the first network 230 may include IR communication. The IR communication may be a communication method in which information is transmitted by using infrared rays. When the control apparatus 210 receives a key input from a user, the control apparatus 210 may generate a control signal including a key code instruction corresponding to an input key. In an embodiment, the control apparatus 210 may generate the control signal including the key code instruction as an IR signal. For example, the control apparatus 210 may generate an infrared signal having a natural frequency allocated to the key code instruction of the input key. The control apparatus 210 may transmit the infrared signal to the electronic device 220 by using the first network 230.

However, this is merely an example, and the first network 230 may include, for example, an RF communication method using an RF communication module or a Wi-Fi communication method, instead of the IR communication.

In an embodiment, the second network 240 may include a BLE communication network. When the control apparatus 210 receives a key input from the user, the control apparatus 210 may generate a control signal including a key code instruction corresponding to an input key as a BLE signal. The control apparatus 210 may transmit the BLE signal to the electronic device 220 through the second network 240.

In an embodiment, the electronic device 220 may transmit a BLE signal to the surroundings. The electronic device 220 may transmit the BLE signal to the surroundings at all times, periodically, at random time intervals, or at pre-set time points.

In an embodiment, the electronic device 220 may differently adjust an interval at which the BLE signal is transmitted when power is turned on and when power is turned off. For example, when power is turned on, the electronic device 220 may more frequently transmit the BLE signal, and when power is turned off, the electronic device 220 may transmit the BLE signal at longer intervals.

The control apparatus 210 may scan the BLE signal transmitted by the electronic device 220 at all times, periodically, at random time intervals, or at pre-set time points. The control apparatus 210 may perform pairing with the electronic device 220 by scanning the BLE signal transmitted by the electronic device 220.

The control apparatus 210 may identify whether power of the electronic device 220 is turned on or off based on the BLE signal received from the electronic device 220 through the second network 240. The control apparatus 210 may detect whether power of the electronic device 220 is turned on or off based on an interval at which the BLE signal is received from the electronic device 220. For example, when an interval at which the BLE signal is received from the electronic device 220 is longer than a certain reference value, the control apparatus 210 may detect that the power of the electronic device 220 is turned off. Likewise, when an interval at which the BLE signal is received from the electronic device 220 is equal to or shorter than the certain reference value, the control apparatus 210 may detect that the power of the electronic device 220 is turned on.

In another embodiment, when power is turned on or off, the electronic device 220 may transmit a signal indicating power-on or power-off. The electronic device 220 may transmit a signal indicating power-on or power-off to the control apparatus 210 by using a BLE signal. For example, the electronic device 220 may include data indicating that power of the electronic device 220 is turned on or off, in the BLE signal. The control apparatus 210 may obtain the data indicating whether power of the electronic device 220 is turned on or off from the BLE signal received from the electronic device 220, and may identify whether power of the electronic device 220 is turned on or off based on the data.

In an embodiment, when the control apparatus 210 detects that the power of the electronic device 220 is turned off, the control apparatus 210 may operate in a first mode. Operating in the first mode may include causing only a first key from among a plurality of keys included in the control apparatus 210 to operate in an interrupt method, and second keys other than the first key from among the plurality of keys not to operate.

In the first mode, only when the control apparatus 210 receives an input of the first key, the control apparatus 210 may generate a signal corresponding to the first key, and may transmit the signal to the electronic device 220 by using the first network 230 or the second network 240. When the control apparatus 210 receives an input of a second key other than the first key, the control apparatus 210 may not recognize a second key input and may not generate a signal corresponding to the second key input.

In an embodiment, when the control apparatus 210 detects that the power of the electronic device 220 is turned on, the control apparatus 210 may operate in a second mode. The second mode may be a mode using a matrix method. In an embodiment, the matrix method may refer to a method in which, when the control apparatus 210 receives a key input, the control apparatus 210 recognizes key inputs of all of a plurality of keys.

In an embodiment, when power of the electronic device 220 is turned on, the electronic device 220 may generate key information. The electronic device 220 may generate key information based on at least one of a current setting state of the electronic device 220 or an output screen state currently output by the electronic device 220. The key information may include information indicating a key for which a key input is received from the user from among the plurality of keys included in the control apparatus 210 but the electronic device is unable to perform an operation according to the key input.

For example, a key for which a key input is received from the user from among the plurality of keys included in the control apparatus 210 but the electronic device 220 is unable to perform an operation according to the key input is referred to as an invalid key. In addition, a key for which a key input is received from the user from among the plurality of keys included in the control apparatus 210 and the electronic device 220 is able to perform an operation according to the key input is referred to as a valid key that is different from the invalid key.

The electronic device 220 may generate key information including an identifier of an invalid key, and may transmit the key information to the control apparatus 210 through the first network 230 or the second network 240.

According to another embodiment, the electronic device 220 may generate key information including an identifier of a valid key, instead of an invalid key. The electronic device 220 may generate key information including an identifier of a valid key and information indicating that a corresponding key is a valid key, and may transmit the key information to the control apparatus 210.

In an embodiment, the control apparatus 210 may receive key information from the electronic device 220 while operating in the second mode. In an embodiment, when the control apparatus 210 identifies that a key selected by the user is an invalid key based on the key information, the control apparatus 210 may not perform an operation corresponding to the key even when the invalid key is selected from the user.

In an embodiment, when the control apparatus 210 identifies that a key selected from the user is a valid key based on the key information, the control apparatus 210 may generate a control signal corresponding to the valid key selected from the user and may transmit the control signal to the electronic device 220.

As such, according to an embodiment, the control apparatus 210 may detect whether power of the electronic device 220 is turned on or off, based on a signal from the electronic device 220.

In addition, according to an embodiment, when power of the electronic device 220 is turned on, the electronic device 220 may generate key information and may transmit the key information to the control apparatus 210.

Only when a key selected from the user is a valid key based on the key information, the control apparatus 210 may transmit a control signal corresponding to the key to the electronic device 220.

Figure 3:
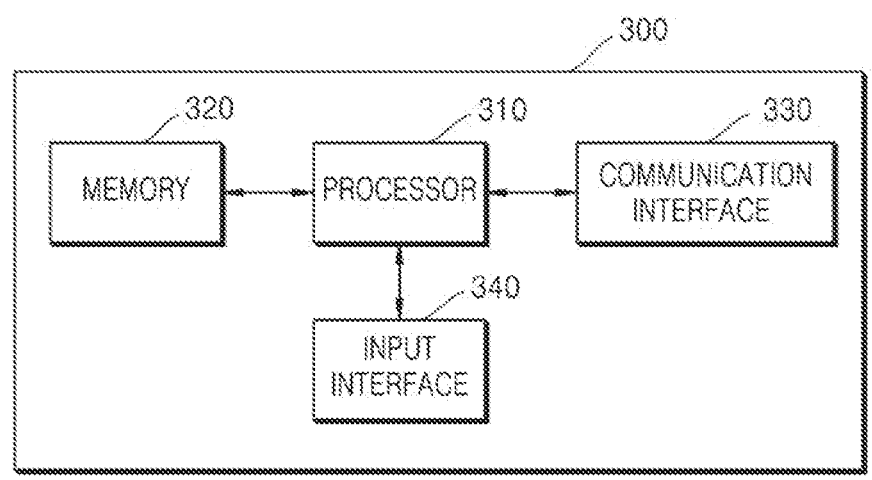
FIG. 3 is an internal block diagram of a control apparatus according to an embodiment.

FIG. 3 is an internal block diagram of a control apparatus 300 according to an embodiment.

Referring to FIG. 3, the control apparatus 300 may include a processor 310, a memory 320, a communication interface 330, and an input unit (input interface) 340.

In an embodiment, the control apparatus 300 may be implemented as any of various devices used to control the electronic device 220. The control apparatus 300 may be implemented as a terminal that may receive any of various types of user inputs, for example, a touch, a press, a touch gesture, a voice, or a motion. For example, the control apparatus 300 may include, but is not limited to, a portable computer such as a notebook computer, a netbook, or a tablet personal computer (PC), a portable terminal such as a smartphone or a personal digital assistant (PDA), a remote controller, a keyboard, a mouse, a joypad, or a terminal in which two or more of the above devices are integrated.

The memory 320 according to an embodiment may store one or more instructions. The memory 320 may store at least one program that may be executed by the processor 310. A pre-defined operation rule or program may be stored in the memory 320. In addition, the memory 320 may store data input to the control apparatus 300 or output from the control apparatus 300.

In an embodiment, the memory 320 may store a key code instruction. The key code instruction may include a key scan code value that is defined by matching a command and data input from the input unit 340. The memory 320 may include a key code instruction corresponding to each of a plurality of keys included in the input unit 340.

The memory 320 may include at least one type of storage medium of a flash memory type storage unit, a hard disk type storage unit, a multimedia card micro type storage unit, a card type memory (e.g., an SD or XD memory), a random-access memory (RAM), a static random-access memory (SRAM), a read-only memory (ROM), an electrically erasable programmable read-only memory (EEPROM), a programmable read-only memory (PROM), a magnetic memory, a magnetic disk, or an optical disk.

The communication interface 330 according to an embodiment may include at least two communication modules. The communicator 330 may connect the control apparatus 300 to an external device such as the electronic device 220 or a server under the control by the processor 310, by using a wired or wireless communication network.

The communication interface 330 may transmit a signal corresponding to a user input to the electronic device 220 through the input unit 340. The signal corresponding to the user input may be a control signal including a key code instruction corresponding to a key selected by a user. The control signal corresponding to the user input may be implemented as a Bluetooth type, an IR signal type, an RF signal type, or a Wi-Fi type.

The communication interface 330 may receive a signal transmitted by the electronic device 220, by using a communication method that is the same as or different from a method of transmitting the signal corresponding to the user input. For example, the electronic device 220 may transmit a BLE signal to surroundings at all times, periodically, at random time intervals, or at pre-set time points. The BLE signal may include a beacon signal. The communication interface 330 may scan the BLE signal transmitted by the electronic device 220 at all times, periodically, at random time intervals, or at pre-set time points.

In an embodiment, when power of the electronic device 220 is turned on or off, the electronic device 220 may transmit a signal indicating power-on or power-off. The electronic device 220 may transmit a signal indicating power-on or power-off to the control apparatus 300 by using the BLE signal. The communication interface 330 may identify whether power of the electronic device 220 is turned on or off based on the BLE signal received from the electronic device 220.

In an embodiment, the electronic device 220 may generate key information. The key information may refer to information indicating a key for which a key input is received from the user from among the plurality of keys included in the input unit 340 and the electronic device 220 is able to perform or is unable to perform an operation corresponding to the key input. The electronic device 220 may generate key information based on at least one of a setting state of the electronic device 220 or an output screen state currently output by the electronic device 220. The electronic device 220 may generate key information with respect to an invalid key from among the plurality of keys included in the input unit 340 of the control apparatus 300 and may transmit the key information to the control apparatus 300. The communication interface 330 may receive the key information from the electronic device 220, and may identify the invalid key from among the plurality of keys included in the input unit 340 based on the key information.

The input unit 340 according to an embodiment may receive a user input for controlling the control apparatus 300. The input unit 340 may include a keypad. The keypad may include a button or a touchpad. The input unit 340 may further include at least one of a wheel for receiving a rotation operation of the user, a keyboard, a dome switch, a microphone configured to receive a voice of the user, or a motion detection sensor configured to recognize a motion of the control apparatus. The input unit 340 may receive an input from the user by using the keypad, the wheel, the keyboard, the dome switch, the microphone, or the motion detection sensor, and may identify a key corresponding to the input.

The processor 310 according to an embodiment control an overall operation of the control apparatus 300. The processor 310 may control the control apparatus 300 to function by executing the one or more instructions stored in the memory 320.

In an embodiment, the processor 310 may be, for example, a micro-controller unit (MCU).

In an embodiment, the processor 310 may detect whether power of the electronic device 220 is turned on or off.

In an embodiment, the processor 310 may detect whether power of the electronic device 220 is turned on or off by using an interval at which a signal is received from the electronic device 220. When an interval at which a signal is received from the electronic device 220 through the communication interface 310 is longer than a certain reference value, the processor 310 may detect that the power of the electronic device 220 is turned off, and when an interval at which a signal is received from the electronic device 220 is equal to or shorter than the certain reference value, the processor 310 may detect that the power of the electronic device 220 is turned on.

In an embodiment, the processor 310 may receive a signal indicating power-on or power-off from the electronic device 220 through the communication interface 310. When the processor 310 receives a signal indicating power-on or power-off from the electronic device 220, the processor 310 may detect whether power of the electronic device 220 is turned on or off based on the received signal.

In an embodiment, when the processor 310 detects that the power of the electronic device 220 is turned off, the processor 310 may control the control apparatus 300 to operate in a first mode. The operating in the first mode may include causing a first key from among the plurality of keys included in the control apparatus 300 to operate in an interrupt method and second keys other than the first key from among the plurality of keys not to operate.

Each of the plurality of keys included in the input unit 340 may be connected to lines of an input pin and an output pin. In an embodiment, when the control apparatus 300 operates in the first mode, the output pin connected to the first key from among the plurality of keys may output an output signal, and the input pin connected to the first key may detect an output signal in an interrupt method in response to a first key input from the user.

In an embodiment, when the input pin connected to the first key detects the output signal in the interrupt method, the processor 310 may wake up. Next, the processor 310 may transmit a signal corresponding to the first key to the electronic device 220. The signal corresponding to the first key may include a control signal including a key code instruction corresponding to the first key. The processor 310 may transmit the control signal corresponding to the first key to the electronic device 220 through the communication interface 330.

In an embodiment, the processor 310 may operate in a sleep mode while the input pin connected to the first key does not detect the output signal in the interrupt method. In an embodiment, the sleep mode may refer to a mode in which the processor 310 does not operate.

In an embodiment, when the first key is input through long-pressing, the processor 310 may wake up in response to a first key input, may transmit a signal corresponding to the first key to the electronic device 220 once, and then may operate in the sleep mode again. Accordingly, the processor 310 may not transmit the signal corresponding to the first key to the electronic device 220 again even while receiving a long-pressed input.

In an embodiment, when the processor 310 detects that the power of the electronic device 220 is turned on, the processor 310 may control the control apparatus 300 to operate in a second mode. In an embodiment, the operating in the second mode may include causing the plurality of keys included in the input unit 340 to operate in a matrix method.

In the second mode, the processor 310 may receive key information from the electronic device 220 through the communication interface 330. The processor 310 may identify whether a key selected from the user from among the plurality of keys included in the input unit 340 is an invalid key based on the key information.

In an embodiment, when an invalid key is selected from the user, the processor 310 may not perform an operation according to an invalid key input. For example, when an invalid key is selected, the processor 310 may not generate a control signal corresponding to the invalid key. According to another embodiment, the processor 310 may generate a control signal corresponding to the invalid key, but may not transmit the control signal to the electronic device 220.

In an embodiment, when the processor 310 identifies that a received key is not an invalid key based on the key information, the processor 310 may generate a control signal corresponding to the received key. The processor 310 may transmit the control signal corresponding to the received key to the electronic device 220 through the communication interface 330, and may control the electronic device 220 to perform an operation corresponding to the key selection.

In an embodiment, when a certain key from among the plurality of keys is input through long-pressing and is not an invalid key, the processor 310 may generate a signal corresponding to the certain key and may transmit the signal to the electronic device 220 through the communication interface 330. The processor 310 may continuously transmit the signal corresponding to the certain key to the electronic device 220 while the certain key is input through long-pressing.

The electronic device 220 may continuously receive the signal corresponding to the certain key that is long-pressed from the control apparatus 300, and may perform an operation according to the certain key input according to the received signal.

In an embodiment, there may be a case where the electronic device 220 may no longer perform the operation according to the certain key input according to the received signal. For example, when the certain key is a volume down key, the electronic device 220 may continuously reduce a volume according to the signal from the control apparatus 300, and when the volume becomes 0, the volume may not be lowered any more. In this case, the electronic device 220 may identify that the volume may no longer be reduced in the current setting state of the electronic device 220, may generate key information indicating that the volume down key is an invalid key, and may transmit the key information to the control apparatus 300. When the processor 310 receives the key information indicating that the volume down key is an invalid key from the electronic device 220 while receiving a long-pressed input of the volume down key included in the input unit 340 from the user, the processor 310 may no longer perform an operation according to the volume down key input even while receiving the long-pressed input of the volume down key. For example, the processor 310 may no longer generate a key code instruction according to the volume down key input, or may no longer transmit a signal including the key code instruction to the electronic device 220.

Figure 4:
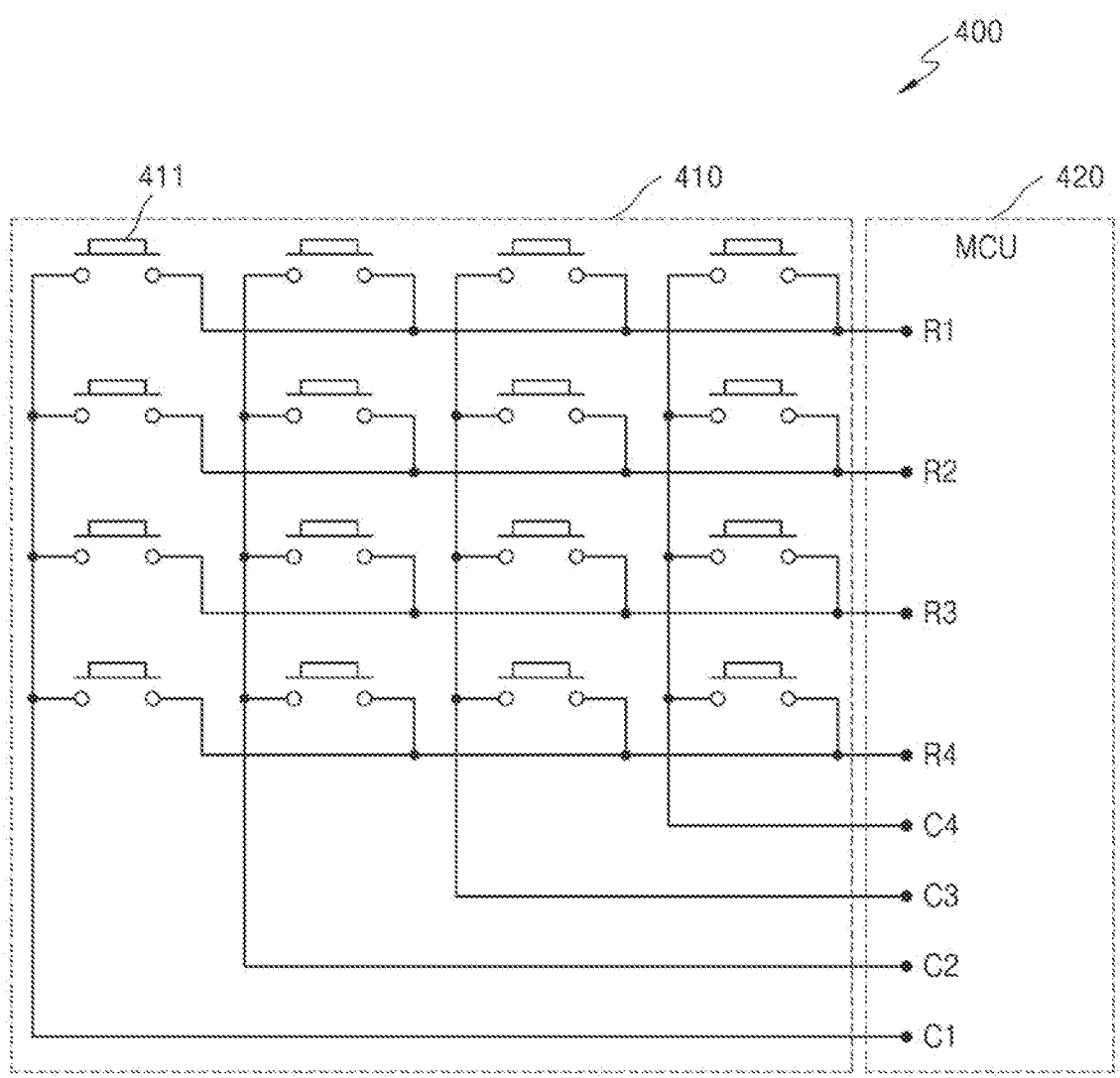
FIG. 4 is an internal block diagram of a control apparatus according to an embodiment.

FIG. 4 is an internal block diagram of a control apparatus according to an embodiment.

A control apparatus 400 of FIG. 4 may include a key input unit 410 and an MCU 420. For example, only the key input unit 410 and the MCU 420 from among internal elements of the control apparatus 400 are illustrated in FIG. 4, but embodiments are not limited thereto. The control apparatus 400 may further include, for example, a memory and a communication interface as shown in FIG. 3.

The key input unit 410 of FIG. 4 may be an example of the input unit 340 included in the control apparatus 300 of FIG. 3. Also, the MCU 420 of FIG. 4 may be an example of the processor 310 of FIG. 3.

The key input unit 410 may include a plurality of keys. The plurality of keys may be used to input numbers, letters and various function information.

The key input unit 410 may include the plurality of keys in a key matrix. In FIG. 4, for example, the key input unit 410 is a 4×4 key matrix including 4 rows and 4 columns.

Each key included in the key matrix may correspond to a switch. The switch may be connected to an input terminal and an output terminal of the MCU 420 by a line. The input terminal and the output terminal connected to the switch may remain separated from each other, and when the switch is selected, the input terminal and the output terminal may be connected to each other.

In an embodiment, the input terminal and the output terminal included in the MCU 420 may be a general-purpose input/output (GPIO). The MCU 420 may include a circuit for GPIO control. The GPIO may be a digital signal pin whose operation including an input or an output may be controlled according to the MCU 420.

The MCU 420 may control an operation of the key input unit 410 by controlling the GPIO. The MCU 420 may divide the GPIO into input pins and output pins, and may connect each of the plurality keys to one input pin and one output pin. For example, the MCU 420 may set C1 through C4 as output pins and R1 through R4 as input pins from among the pins of the GPIO of FIG. 4.

In an embodiment, the MCU 420 may operate in different modes according to whether power of the electronic device 220 is turned on or off.

In an embodiment, when the MCU 420 detects that the power of the electronic device 220 is turned off, the MCU 420 may control the control apparatus 400 to operate in a first mode.

In an embodiment, when the MCU 420 detects that the power of the electronic device 220 is turned on, the MCU 420 may control the control apparatus 400 to operate in a second mode.

A case where the control apparatus 400 operates in the second mode when power of the electronic device 220 is turned on will be first described. The second mode may be referred to as a scan mode method or a matrix method.

In a scan mode, in order to operate 16 keys included in the 4×4 key matrix, 4 input pins and 4 output pins, that is, a total of 8 pins, are required. In the scan mode, the MCU 420 may enable all of the output pins C1 through C4 and the input pins R1 through R4 from among the pins of the GPIO. When a pin is enabled, it may mean that an output pin is activated to continuously transmit data and an input pin is activated to receive data from the output pin according to an input of a user.

In the scan mode, different data may be applied to the output pins C1 through C4. Each output pin may output data applied at all times or periodically as an output signal. The input pins R1 through R4 may wait while scanning whether an output signal is received from the output pin.

When one of the plurality of keys is selected and an output pin and an input pin connected to the selected key are connected to each other, the MCU 420 may detect which key is selected by identifying the output pin and the input pin. The MCU 420 may transmit a control signal corresponding to a key code instruction corresponding to the selected key to the electronic device 220, and may control the electronic device 220 to perform an operation according to the selected key.

In an embodiment, when power of the electronic device 220 is turned on, the electronic device 220 may generate key information.

The electronic device 220 may identify whether a certain key is an invalid key based on at least one of a setting state of the electronic device 220 or an output screen state currently output by the electronic device 220.

For example, an invalid key for which an operation according to a key input from among the keys included in the key input unit 410 may not be performed may vary, according to whether a source setting state of content output by the electronic device 220 is a real-time broadcasting channel received from a broadcasting station through a tuner or content received from a server through a wired/wireless communication network.

Assuming that the electronic device 220 outputs a broadcasting channel currently received through a turner, even when a key for controlling content received through a wired/wireless communication network from among the plurality of keys included in the key input unit 410 is selected, the electronic device 220 is unable to perform an operation according to the key selection. For example, even when the electronic device 220 receives a key code instruction corresponding to a "replay" key or a "movie" key from among the plurality of keys included in the key input unit 410 from the control apparatus 400, the electronic device 220 is unable to perform an operation according to the key selection. In this case, the electronic device 220 may generate key information indicating that the "replay" key or the "movie" key is an invalid key.

For example, when a current volume setting state of the electronic device 220 is at a maximum value or a minimum value, and thus the electronic device 220 may no longer increase or reduce a volume, the electronic device 220 may generate key information indicating that a volume up key or a volume down key is an invalid key.

According to another embodiment, the electronic device 220 may generate key information based on an output screen state currently output by the electronic device 220. For example, when an object that is currently focused from among objects included in a screen may no longer be moved according to a four directional key input, the electronic device 220 may generate key information indicating that four-way keys are invalid keys.

The electronic device 220 may generate key information including a key identifier of an invalid key, and may transmit the key information to the control apparatus 400. Whenever a key corresponding to the invalid key is changed or in every certain period, the electronic device 220 may update invalid key information. For example, the electronic device 220 may include a volume up key in an invalid key when a volume value is set to a maximum value, or may not include the volume up key in the invalid key when a volume value is changed to a value other than the maximum value. When key information is newly generated or whenever existing key information is updated, the electronic device 220 may transmit updated key information to the control apparatus 400.

In an embodiment, when the control apparatus 400 receives key information from the electronic device 220, the control apparatus 400 may identify an invalid key from among the plurality of keys included in the key input unit 410 based on the key information.

In an embodiment, only when a valid key, not an invalid key, is selected from the user, the control apparatus 400 may transmit a key code instruction corresponding to the valid key to the electronic device 220. For example, when the control apparatus 400 receives an invalid key selected from the user, the control apparatus 400 may not transmit a key code instruction corresponding to the invalid key.

In an embodiment, the user may select a certain key from among the plurality of keys included in the key input unit 410 through long-pressing. When a key is input through long-pressing, it may mean that the key is input for several seconds or more.

When a certain key is input through long-pressing, the control apparatus 400 may identify whether the certain key is a valid key, and when the certain key is a valid key, the control apparatus 400 may transmit a key code instruction corresponding to the certain key to the electronic device 220. The control apparatus 400 may continuously transmit the key code instruction corresponding to the certain key to the electronic device 220 while the certain key is long-pressed.

In an embodiment, when the electronic device 220 operating according to a key code instruction from the control apparatus 400 may no longer perform the operation, the electronic device 220 may update key information. For example, the control apparatus 400 may receive a long-pressed input of a volume up key from the user, and may transmit a key code instruction corresponding to the volume up key to the electronic device 220. The electronic device 220 may continuously increase a volume according to the key code instruction corresponding to the volume up key, and when a volume value reaches a maximum value, the electronic device 220 may update key information and may include the volume up key in the key information.

When the control apparatus 400 receives key information indicating that the volume up key is an invalid key from the electronic device 220, even if the control apparatus 400 continuously receives an input of the volume up key from the user, the control apparatus 400 may no longer transmit the key code instruction corresponding to the volume up key to the electronic device 220.

As such, when power of the electronic device 220 is turned on, the control apparatus 400 may not transmit a key code instruction corresponding to an invalid key to the electronic device 220, thereby preventing or reducing unnecessary power consumption.

Next, an example where the control apparatus 400 operates in the first mode when power of the electronic device 220 is turned off will now be described. The first mode may be an interrupt mode or a mode using an interrupt method.

In an embodiment, the first mode may refer to a mode in which, when the control apparatus 400 receives a key input, the control apparatus 400 detects a key input of some keys from among the plurality of keys by using an interrupt signal and does not recognize a key input of the remaining keys.

When it is detected that the power of the electronic device 220 is turned off, the control apparatus 400 may change a pin setting of hardware from the second mode to the first mode. When a pin setting of hardware is changed to the first mode, the MCU 420 may adjust a register value of a GPIO pin operating in a scan mode to operate in an interrupt mode in which the pin may detect an interrupt signal.

In order for a key to operate in an interrupt mode, one input pin and one output pin should be connected for each key. Accordingly, when the number of keys is N, 2×N pins are required. For example, in order for 16 keys of FIG. 4 to operate, a total of F 32 pins are required.

In an embodiment, the control apparatus 400 may operate with a small number of pins by controlling only a specific key, not all of the plurality of keys, to operate in an interrupt mode and controlling the remaining keys not to operate.

Assuming that power of the electronic device 220 is turned off, only when a specific key, for example, a power-on key, is selected from among the plurality of keys included in the key input unit 410, the electronic device 220 performs an operation according to the specific key, and when keys other than the power-on key are selected, the electronic device 220 is unable to operate accordingly even though a key code instruction corresponding to the selected keys is received.

In an embodiment, in a state where power of the electronic device 220 is turned off, the control apparatus 400 may enable only a specific key that may operate according to a key code instruction from the control apparatus 400 and may disable the remaining keys.

For example, the control apparatus 400 may set only an input pin and an output pin connected to a power-on key to detect an interrupt signal by controlling only the power-on key, from among the plurality of keys, to be activated and operate in an interrupt mode and controlling the remaining keys to be inactivated. In this case, because the number of activated keys is limited, the number of required pins is also reduced.

In FIG. 4, for example, when a key 411 from among the plurality of keys included in the key input unit 410 is a power key, an output pin connected to the power key 411 is C1 and an input pin connected to the power key 411 is R1.

In an interrupt mode, the MCU 420 may apply a high signal to an output pin connected to a specific key to be activated. For example, the MCU 420 may pull up the output pin C1 connected to the power key 411 to the high signal in FIG. 4. The MCU 420 may pull down the output pin connected to the remaining keys other than the specific key to a low signal, thereby applying the low signal to output pins connected to the remaining keys. Because the low signal is applied to the output pins connected to the remaining keys, current may not flow and may be disabled.

In an interrupt mode, the MCU 420 may adjust a register value of an input pin connected to a specific key to be activated, and thus may set the input pin connected to the specific key to have a function of detecting a logic change from high to low and from low to high. In addition, the MCU 420 may not set input pins connected to keys other than the specific key to have the function. In this case, even when switches of the keys other than the specific key are pressed, the input pins connected to the keys are unable to detect a change from high to low and from low to high, and thus are disabled.

In an embodiment, the MCU 420 may apply a low signal to the input pin R1 connected to the power key 411. When the user selects the power key 411, a high signal applied to the output pint C1 is applied to the input pin R1, and thus a signal rises from low to high. When a time when a signal rises from low to high is a rising edge, the input pin R1 may detect the rising edge as an interrupt. Likewise, when the user presses the power key 411 and then releases the power key 411, the input pin R1 and the output pin C1 are separated from each other. Accordingly, a signal flowing through the input pin R1 falls from high to low. When a time when a signal falls from high to low is a falling edge, the input pin R1 may detect the falling edge as an interrupt.

In an embodiment, when the input pin R1 detects an interrupt, the input pin R1 may notify the detection result to the MCU 420 and the MCU 420 may wake up from a sleep mode.

In an embodiment, the MCU 420 may operate in a sleep mode in an interrupt mode. The sleep mode may refer to a state in which the MCU 420 does not operate. The sleep mode may refer to a power saving mode or a standby mode. In the sleep mode, because the MCU 420 does not perform data processing or the like, power may be saved.

The MCU 420 may operate in a sleep mode while the input pin R1 does not detect an interrupt signal. When the input pin R1 detects an interrupt, the MCU 420 may wake up from the sleep mode. The MCU 420 may wake up and may transmit a key code instruction corresponding to the power key 411 to the electronic device 220. The MCU 420 may operate again in the sleep mode until the input pin R1 detects an interrupt again.

In an embodiment, when the user presses a specific key to be activated, for example, the power key 411, through long-pressing, the power key 411 may operate in an interrupt method. In a state where the output pin c1 connected to the power key 411 outputs a high signal, when the user selects the power key 411, the input pin R1 connected to the power key 411 may be connected to the output pin C1, and the input pin R1 may detect a rising edge as an interrupt. When the input pin R1 detects a signal from the output pin C1 in an interrupt method, the MCU 420 may wake up and may transmit a key code instruction corresponding to the power key 411 to the electronic device 220.

Thereafter, the MCU 420 may operate in a sleep mode again until the input pin R1 detects a new interrupt. For example, after the MCU 420 transmits the key code instruction corresponding to the power key 411 to the electronic device 220 once, the MCU 420 may operate in the sleep mode again while receiving a long-pressed input.

When the user releases the long-pressed input, the input pin R1 may detect a falling edge according to the release of the long-pressed input as an interrupt, and may notify the detection result to the MCU 420, to wake up the MCU 420 from the sleep mode. The MCU 420 may generate a release signal and may transmit the release signal to the electronic device 220.

In another embodiment, even when the input pin R1 detects a falling edge according to the release of the long-pressed input as an interrupt, the input pin R1 may not notify the detection result to the MCU 420. For example, only when the input pin R1 detects a rising edge, the input pint R12 may notify the detection result to the MCU 420 to wake up the MCU 420, and when the input pin R1 detects a falling edge, the input pin R1 may not notify the detection result to the MCU 420. In this case, only when the input pin R1 detects a rising edge as an interrupt, the MCU 420 may wake up, and otherwise, the MCU 420 may continuously operate in the sleep mode.

In an embodiment, when the user selects a key other than a specific key to be activated, for example, when the user presses a key other than the power key 411 of FIG. 4, the other key may not operate. Because the MCU 420 does not set a key other than a specific key to have a function of detecting an interrupt signal in an interrupt mode, even when a switch of the other key is pressed, an input pin connected to the other key is unable to detect a change from high to low or from low to high. In this case, the MCU 420 may continuously operate in a sleep mode.

As such, according to an embodiment, the control apparatus 400 may operate in the first mode and the second mode by adjusting a register value of a pin connected to a key according to a power state of the electronic device 220.

According to an embodiment, in the first mode, the control apparatus 400 may enable only a specific key that may be activated to detect an interrupt signal, and may disable other keys, thereby preventing or reducing unnecessary power consumption due to the operation of the other keys.

According to an embodiment, in the second mode, the control apparatus 400 may identify an invalid key and a valid key based on key information received from the electronic device 220 and, when the invalid key is selected, the control apparatus 400 may not transmit a key code instruction according to the key selection to the electronic device 220, thereby preventing or reducing unnecessary power consumption.

Figure 5A:
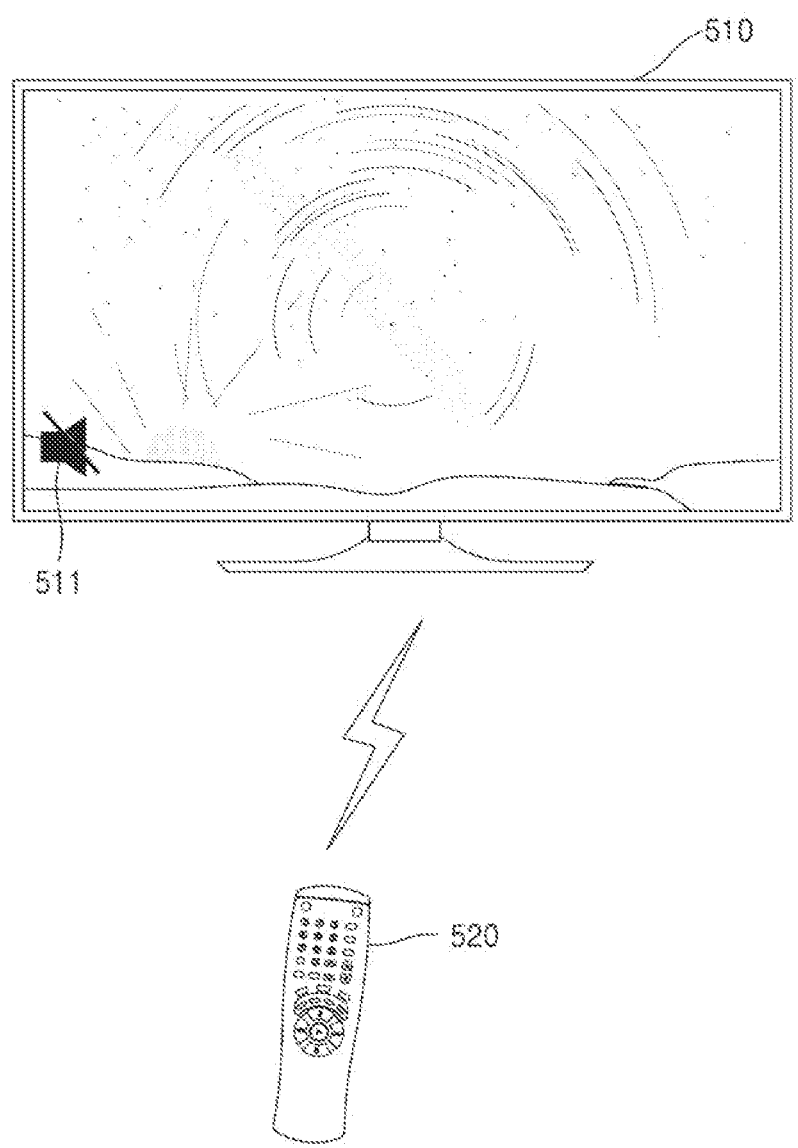
FIG. 5A is a view illustrating that an electronic device generates key information based on a setting state of the electronic device according to an embodiment.
Figure 5B:
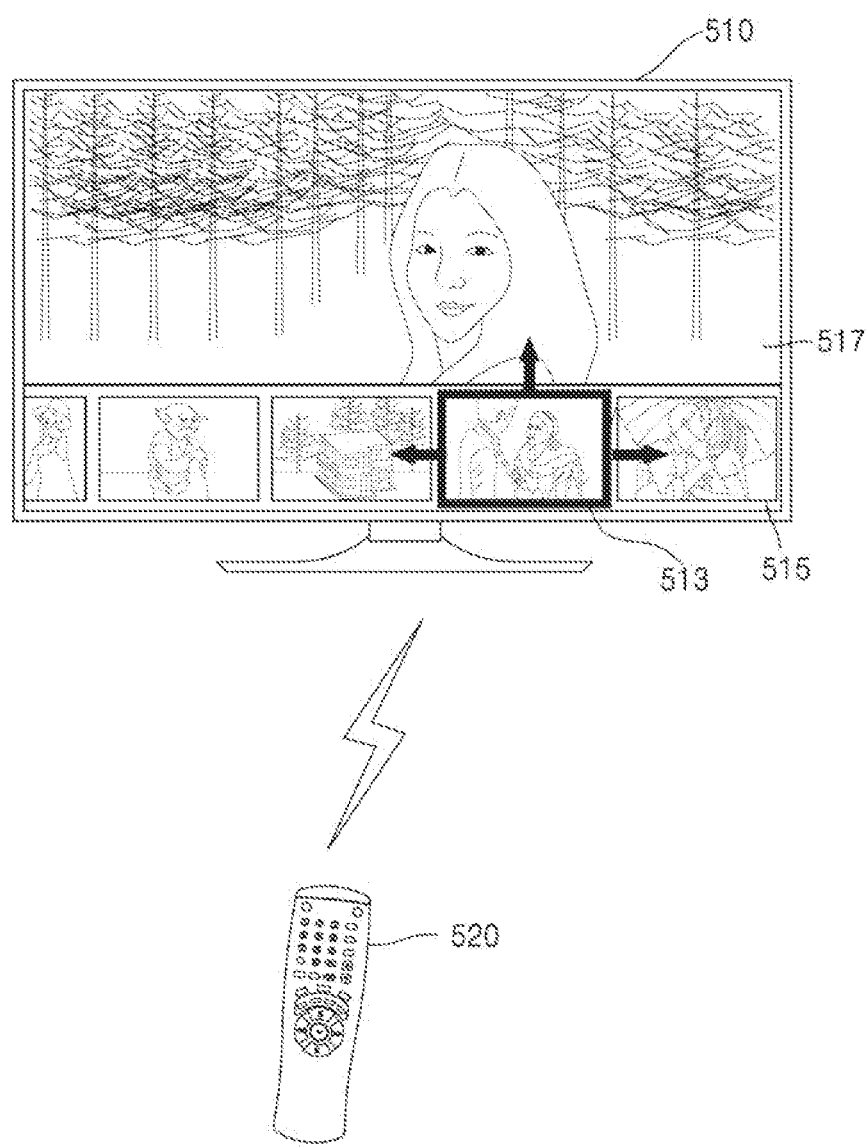
FIG. 5B is a view illustrating that an electronic device generates key information based on an output screen state that is currently output according to an embodiment.

FIGS. 5A and 5B are views illustrating that an electronic device generates key information. FIG. 5A is a view illustrating that an electronic device generates key information based on a setting state of the electronic device according to an embodiment.

Referring to FIGS. 5A and 5B, an electronic device 510 may output content. In an embodiment, the electronic device 510 may be an image display apparatus such as a television configured to output content on a screen.

The electronic device 510 may generate key information indicating a key, that is, an invalid key, which is selected by a user from among a plurality of keys included in a control apparatus 520, but the electronic device 510 is unable to perform an operation according to the key selection. The key information may include an identifier of the invalid key.

In an embodiment, the electronic device 510 may generate key information based on a current state of the electronic device 510. The current state of the electronic device 510 may include at least one of a setting state of the electronic device 510 or an output screen state of the electronic device 510.

The setting state of the electronic device 510 may include at least one of a source setting state of content currently output by the electronic device 510 or a function setting state.

In an embodiment, the source setting state of the content may be information indicating a source of the content currently output by the electronic device 510.

The electronic device 510 may directly receive broadcasting content as an RF signal from a broadcasting station. In addition, the electronic device 510 may be connected to various source devices, and may receive content from the source devices. The source devices may include at least one of a personal computer (PC), a digital versatile disk (DVD) player, a video game console, a set-top box, an audio/video (AV) receiver, a cable receiver or a satellite broadcasting receiver, or an Internet receiving device for receiving content from an over-the-top (OTT) service provider or an Internet protocol television (IPTV) service provider.

In an embodiment, the electronic device 510 may receive content from various sources. The electronic device 510 may receive broadcasting content as a terrestrial radio signal from a broadcasting station, may receive broadcasting content from a satellite or cable broadcasting station, or may receive content through the Internet from a content providing server operated by an OTT service provider or an IPTV service provider. Also, the electronic device 510 may receive game content or DVD content from a source device such as a game console or a DVD player.

In an embodiment, content may include various items such as, for example, movie, drama, music, or game, and may include at least one of a video signal, an audio signal, or a text signal.

According to a source of content, that is, according to whether content is a terrestrial radio signal received from a broadcasting station, content received as a wired signal such as a cable, or content received by using an Internet protocol from an OTT service provider or an IPTV service provider, a function performed by the electronic device 510 may be limited.

The electronic device 510 may set an invalid key from among the plurality of keys included in the control apparatus 520 based on a source of content that is currently output. For example, assuming that content currently output by the electronic device 510 is a terrestrial radio broadcasting signal received from a broadcasting station, only when some limited keys of the plurality of keys included in the control apparatus 520 are selected, the electronic device 510 may operate according to the selected keys. Only when limited keys such as a power key, a number key for inputting a channel number, a channel up key, a channel down key, a volume up key, a volume down key, and a source change key are selected from among the plurality of keys included in the control apparatus 520, the electronic device 510 may operate according to the selected keys, and when a key other than the limited keys is selected, the electronic device 510 may not operate according to the selected key. For example, when a key such as four-way keys, a home screen key, a television replay key, or a specific category view key such as movie or drama is selected from among the plurality of keys, the electronic device 510 may not operate according to the key.

The electronic device 510 may stream or download content provided by an OTT service provider or an IPTV service provider through the Internet and may output the content on a screen. For example, when the electronic device 510 streams and outputs movie content provided by the OTT service provider, the electronic device 510 may operate according to the power key, the volume up key, or the volume down key from among the plurality of keys included in the control apparatus 520, but when the number key for inputting a channel number, the channel up key, or the channel down key is selected, the electronic device 510 may not operate according to the key.

The electronic device 510 may generate key information indicating an invalid key that does not operate, based on a source of currently output content.

In an embodiment, the electronic device 510 may generate key information based on a current function setting state of the electronic device 510. The function setting state of the electronic device 510 that is a state for various functions of the electronic device 510 may include at least one of, for example, a volume state, a currently output channel state, or a setting function state of the electronic device 510.

For example, when a current volume state of the electronic device 510 is set to a minimum value, the electronic device 510 may no longer reduce a volume even when the volume down key from among the keys included in the control apparatus 520 is selected.

Referring to FIG. 5A, a current volume state of the electronic device 510 is set to be silent. The electronic device 510 may output a silent state identifier 511 on the screen. In this case, the electronic device 510 may generate key information indicating that the volume down key or a silent key is an invalid key based on the current volume state.

In an embodiment, assuming that the control apparatus 520 receives key information indicating that the volume down key or the silent key is an invalid key from the electronic device 510, even when the volume down key or the silent key is selected from the user, the control apparatus 520 may not transmit a key code instruction according to the key selection to the electronic device 510.

Channel numbers that may be output by the electronic device 510 may be 1 to 100, and a current channel may be a channel 1 with a lowest channel number. In this case, even when the channel down key is selected from among the keys included in the control apparatus 520, the electronic device 510 may no longer lower a channel. In some cases, the electronic device 510 may reversely output beginning from a channel with a highest channel number, for example, a channel 100, according to a channel down key input, but, in another embodiment, the electronic device 510 may determine the channel down key as an invalid key and may generate key information including the channel down key. The control apparatus 520 may receive the key information indicating that the channel down key is an invalid key from the electronic device 510, and even when the channel down key is selected from the user, the control apparatus 520 may not transmit a key code instruction according to the key selection to the electronic device 510.

In an embodiment, the electronic device 510 may generate key information based on a current setting function state of the electronic device 510. The setting function state may include various setting-related function states such as brightness, contrast, gamma, backlight brightness, sharpness, colorfulness, and tint of the screen of the electronic device 510. For example, when the electronic device 510 outputs an on-screen display (OSD) menu for selecting a setting function on the screen, the user may select a desired parameter from among a plurality of screen setting parameters output on the OSD menu by using a key included in the control apparatus 520, and may change a value of the selected parameter to a desired value. For example, a function setting for screen sharpness may be selected and screen sharpness of the electronic device 510 may be already set to a highest value. In this case, the electronic device 510 may not adjust a parameter value of screen sharpness even when a key for increasing screen sharpness is selected and received from the control apparatus 520. In this case, the electronic device 510 may determine the key for increasing screen sharpness as an invalid key, and may generate key information including the invalid key.

The control apparatus 520 may receive the key information from the electronic device 510, and then, even when the key for increasing sharpness is selected from the user, the control apparatus 520 may not transmit a key code instruction according to the key selection to the electronic device 510.

In an embodiment, the electronic device 510 may newly generate key information or update existing key information whenever an invalid key is changed or in every certain period. For example, in FIG. 5A, when the user selects the volume up key, the electronic device 510 may increase a volume of the electronic device 510. In this case, the electronic device 510 may identify that the volume down key is no longer an invalid key, and may update key information by removing information about the volume down key from key information.

In an embodiment, there may be a case where a certain key included in the control apparatus 520 is input through long-pressing for a certain period of time or more. When the certain key is not an invalid key, the control apparatus 520 may continuously transmit a key code instruction corresponding to the certain key to the electronic device 510. The electronic device 510 may receive the key code instruction for the certain key, and may perform an operation according to the certain key.

In an embodiment, the electronic device 510 performing an operation according to a certain key input may no longer perform the operation according to the certain key input. For example, when the user inputs the volume up key using long-pressing, the electronic device 510 continuously increases a volume, the volume reaches a maximum value, and thus the electronic device 510 may no longer increase the volume, the electronic device 510 may generate key information indicating that the volume up key is an invalid key and may transmit the key information to the control apparatus 510.

The control apparatus 510 may receive the key information indicating that the volume up key is an invalid key from the electronic device 510 while receiving a long-pressed input of the volume up key from the user. In this case, even when the user continuously inputs the volume up key through long-pressing, the control apparatus 510 may no longer transmit a key code instruction corresponding to the volume up key to the electronic device 510.

As such, according to an embodiment, the electronic device 510 may generate key information based on a source setting state of content output by the electronic device 510 or a function setting state such as a volume, a channel, or a setting.

According to an embodiment, when a selected key is an invalid key based on key information, the control apparatus 520 may not transmit a key code instruction corresponding to the selected key to the electronic device 510.

FIG. 5B is a view illustrating that an electronic device generates key information based on an output screen state that is currently output according to an embodiment.

In an embodiment, the electronic device 510 may generate key information based on a current output screen state. For example, when a screen currently output by the electronic device 510 includes a plurality of objects and each of the plurality of objects is a selectable object, the user may select one of the plurality of objects by using the four-way keys or a selection button such as "OK" included in the control apparatus 520.

FIG. 5B illustrates that a screen currently output by the electronic device 510 includes a plurality of objects. The user may focus on one of the plurality of objects by using the control apparatus 520. When the focused object from among the plurality of objects is 513, the electronic device 510 may move to the right, left, or upper side of the focused object 513. In this case, the electronic device 510 may operate according to a direction key input for moving to the right, left, or upper side from among the plurality of keys included in the control apparatus 520.

In contrast, the electronic device 510 is unable to move to the lower side of the focused object 513 on the current output screen. The electronic device 510 may determine that a key for moving to the lower side is an invalid key based on a location of the focused object on the currently output screen, and may generate the key for moving to the lower side as key information.

The control apparatus 520 may receive the key information indicating that the key for moving to the lower side is an invalid key from the electronic device 510, and even when the control apparatus 520 receives an input of the key for moving to the lower side from among the four-way keys from the user, the control apparatus 520 may not transmit a key code instruction according to the key selection to the electronic device 510.

In FIG. 5B, when the user inputs a key for moving to the right from among the four-way keys included in the control apparatus 520, the electronic device 510 may move a focus to an object 515 located at the right of the focused object 513. In this case, the electronic device 510 may identify that a focus may no longer be moved rightward because the currently focused object 515 is a rightmost object. The electronic device 510 may generate key information indicating the key for moving to the right from among the four-way keys is an invalid key. The control apparatus 520 may receive the key information from the electronic device 510, and even when the key for moving to the right is selected, the control apparatus 520 may not transmit a key code instruction according to the key selection to the electronic device 510.

In an embodiment, the electronic device 510 may generate new key information or update existing key information in every certain period, at all times, or whenever an event where key information is to be changed occurs, and may transmit the information to the control apparatus 520.

For example, when the electronic device 510 receives a key code instruction corresponding to a direction key for moving a focus to the upper side of the focused object 513 on the screen of FIG. 5B, the electronic device 510 may move the focus to an object 517 located above the object 513. In this case, the electronic device 510 may identify that the object 517 is focused, and may identify that the key for moving to the lower side with respect to the focused object 517 is no longer an invalid key. The electronic device 510 may remove the key for moving to the lower side from key information, and may update existing key information or generate new key information.

As such, according to an embodiment, the electronic device 510 may generate key information by considering the existence of a selectable object and a location of a currently focused object, based on an output screen output by the electronic device 510.

Even when a key is selected based on the key information received from the electronic device 510, the control apparatus 520 may not transmit a key code instruction corresponding to the key to the electronic device 510.

Figure 6:
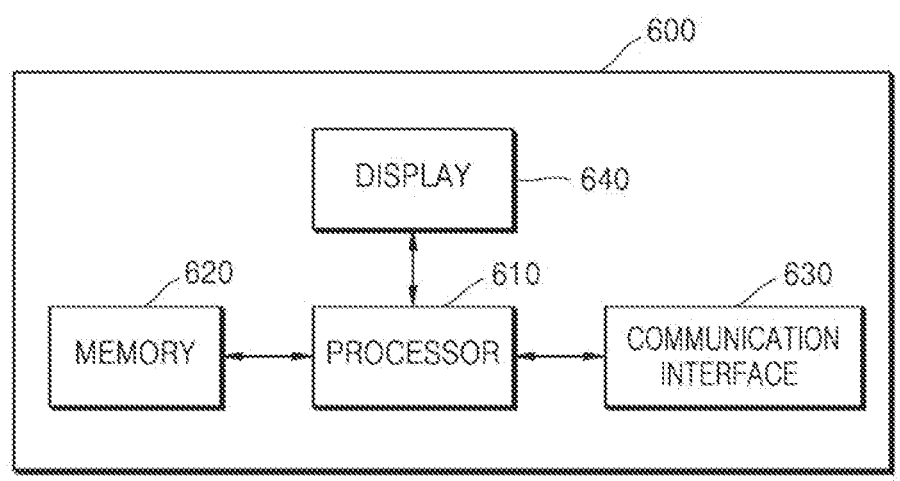
FIG. 6 is an internal block diagram of an electronic device according to an embodiment.

FIG. 6 is an internal block diagram of an electronic device, according to an embodiment of the disclosure.

Referring to FIG. 6, an electronic device 600 may include a processor 610, a memory 620, a communication interface 630, and a display 640. The electronic device 600 of FIG. 6 may be included in the electronic device 220 of FIG. 2. Accordingly, the same description as that made with reference to FIG. 2 will be omitted.

In an embodiment, the electronic device 600 may be an image display apparatus. The image display apparatus may be a digital TV configured to receive a digital broadcasting service, but embodiments are not limited thereto. The image display apparatus may be implemented as any of various electronic devices configured to output content.

For example, the electronic device 600 may include at least one of a desktop, a smartphone, a tablet PC, a mobile phone, a video phone, an e-book reader, a laptop PC, a netbook computer, a digital camera, a PDA, a portable multimedia player (PMP), a camcorder, a navigation device, a wearable device, a smart watch, a home network system, a security system, or a medical device. The electronic device 600 may be of a fixed type or a movable type.

In an embodiment of the disclosure, the display 640 may display content provided by content providers on a screen. The display 640 may output a broadcasting program received in real time on the screen, or may output content streamed or downloaded from a server on the screen.

When the display 640 is implemented as a touch screen, the display 640 may be used as an input device such as a user interface in addition to an output device. For example, the display 640 may include at least one of a liquid crystal display, a thin film transistor-liquid crystal display, an organic light-emitting diode, a flexible display, a three-dimensional (3D) display, or an electrophoretic display. According to an implementation type of the display 640, two or more displays 640 may be provided.

The communication interface 630 may connect the electronic device 600 to an external device or a server under the control by the processor 610, by using a wired or wireless communication network. The electronic device 600 may download a program or an application required by the electronic device 600 from the external device or the server or may perform web browsing through the communication interface 630.

The communication interface 630 may receive a control signal including a key code instruction according to a key input from the control apparatus 210 such as a remote controller under the control by the processor 610. The control signal may be implemented as, but not limited to, a Bluetooth type, an RF signal type, or a Wi-Fi type.

In an embodiment of the disclosure, the communication interface 630 may transmit a BLE signal in every certain period. The communication interface 630 may transmit BLE signals at different intervals to surroundings when power of the electronic device 600 is turned on and off, so that the control apparatus 210 detects whether power of the electronic device 600 is turned on or off. Alternatively, when power of the electronic device 600 is turned on or off, the communication interface 630 may directly transmit a signal indicating power-on or power-off to the control apparatus 210.

In an embodiment of the disclosure, when power of the electronic device 600 is turned on, the communication interface 630 may transmit key information to the control apparatus 210. The communication interface 630 may transmit key information to the control apparatus 210 at all times, in every certain period, or whenever key information is updated or newly generated.

The memory 620 according to an embodiment may store one or more instructions. The memory 620 may store at least one program executed by the processor 610. A pre-defined operation rule or program may be stored in the memory 620. In addition, the memory 620 may store data input to the electronic device 600 or output from the electronic device 600.

In an embodiment, the memory 620 may store a key identifier for identifying a plurality of keys included in the control apparatus 210.

In an embodiment, when a plurality of control apparatuses 210 configured to control the electronic device 600 are provided, the electronic device 600 may store an identifier of each of the plurality of control apparatuses 210 and a key identifier for each control apparatus having each identifier.

The processor 610 may identifier an invalid key that may not operate in a current state, based on a current state of the electronic device 600 and a key identifier stored in the memory 620. The electronic device 600 may generate key information including a key identifier of the invalid key.

The memory 620 may include at least one type of storage medium of a flash memory type storage unit, a hard disk type storage unit, a multimedia card micro type storage unit, a card type memory (e.g., an SD or XD memory), a RAM, an SRAM, a ROM, an EEPROM, a PROM, a magnetic memory, a magnetic disk, or an optical disk.

The processor 610 controls an overall operation of the electronic device 600. The processor 610 may control the electronic device 600 to function by executing the one or more instructions stored in the memory 620.

In an embodiment, when power of the electronic device 600 is turned on, the processor 610 may generate key information based on a current state of the electronic device 600.

In an embodiment, the processor 610 may generate key information based on a setting state of the electronic device 600. The setting state of the electronic device 600 may include at least one of a source of content output by the electronic device 600 or a function setting state such as a volume, a channel, or a setting.

In an embodiment, the processor 610 may generate key information based on a screen state that is currently output on the display 640 of the electronic device 600. The screen state that is currently output may be determined according to the number of objects included in a screen or the selectability of an object.

Figure 7:
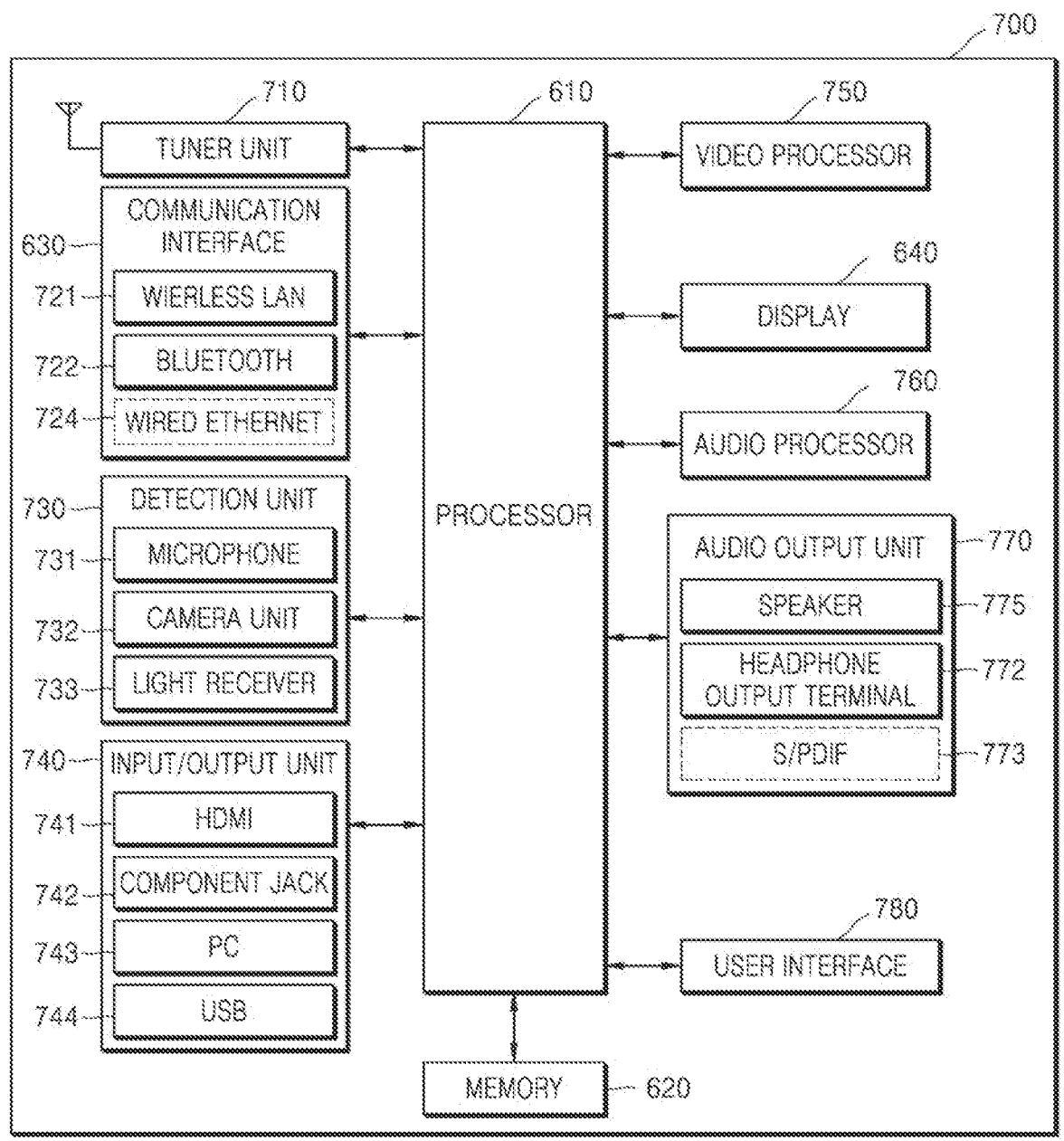
FIG. 7 is an internal block diagram of an electronic device according to an embodiment.

FIG. 7 is an internal block diagram of an electronic device according to an embodiment.

An electronic device 700 of FIG. 7 may include elements of the electronic device 600 of FIG. 6. Accordingly, the same description as that made with reference to FIG. 6 will be omitted.

Referring to FIG. 7, the electronic device 700 may further include a tuner unit 710, a detection unit 730, an input/output unit 740, a video processor 750, an audio processor 760, an audio output unit 770, and a user interface 780 in addition to the processor 610, the memory 620, the communication interface 630, and the display 640.

The tuner unit 710 may tune and select only a frequency of a channel to be received by the electronic device 700 from among many radio wave components through amplification, mixing, and resonance of broadcasting content that is received by wire or wirelessly. Content received through the tuner unit 710 is decoded into an audio, a video, and/or additional information. The audio, the video, and/or the additional information may be stored in a memory 620 under the control by the processor 610.

The communication interface 630 may connect the electronic device 700 to a peripheral device or an external device, a server, or the control apparatus 210 under the control by the processor 610. The communication interface 630 may include at least one of wireless LAN 721, Bluetooth 722, or wired Ethernet 724 according to the performance and structure of the electronic device 700.

The communication interface 630 may receive a control signal through the control apparatus 210 such as a remote controller under the control by the processor 610. The control signal may be implemented as a Bluetooth type, an RF signal type, or a Wi-Fi type. The communication interface 630 may further include short-range communication (e.g., near-field communication (NFC)) in addition to the Bluetooth 722.

In an embodiment of the disclosure, the Bluetooth 722 may include a BLE communication module. The BLE communication module may transmit/receive a signal to/from the control apparatus 210 through a BLE communication method.

The detection unit 730 may detect a voice, an image, or an interaction of a user, and may include a microphone 731, a camera unit 732, and a light receiver 733. The microphone 731 may receive a voice of the user, may convert the received voice into an electrical signal, and may output the electrical signal to the processor 610. The camera unit 732 may include a sensor and a lens, and may capture an image formed on a screen. The light receiver 733 may receive an optical signal including a control signal.

The light receiver 733 may receive an optical signal corresponding to a user input (e.g., a touch, a press, a touch gesture, a voice, or a motion) from the control apparatus 210 such as a remote controller or a mobile phone. The received optical signal may include a key code instruction corresponding to a key input of the control apparatus 210. The processor 610 may extract the key code instruction from the optical signal received by the light receiver 733, and may control the electronic device 700 to operate according to the key code instruction.

The input/output unit 740 may receive a video (e.g., a moving image signal or a still image signal), an audio (e.g., a voice signal or a music signal), and additional data such as metadata, from a device outside the electronic device 700 under the control by the processor 610. The metadata may include high-dynamic-range (HDR) information for content, a description or content title for the content, or a content storage location. The input/output unit 740 may include one of a high-definition multimedia interface (HDMI) port 741, a component jack 742, a PC port 743, and a universal serial bus (USB) port 744. The input/output unit 740 may include a combination of the HDMI port 741, the component jack 742, the PC port 743, and the USB port 744.

The video processor 750 may process image data to be displayed on the display 640, and may perform any of various image processing operations such as decoding, rendering, scaling, noise removal, frame rate conversion, or resolution conversion on the image data.

The display 640 may output, on the screen, content received from a broadcasting station or received from an external server or an external storage medium. The content that is a media signal may include a video signal, an image, or a text signal. Also, the display 640 may display a video signal or an image received through the HDMI port 741 on the screen.

The audio processor 760 performs processing on audio data. The audio processor 760 may perform any of various processing operations such as decoding, amplification, or noise removal on the audio data.

The audio output unit 770 may output an audio included in content received through the tuner unit 710, an audio input through the communication interface 630 or the input/output unit 740, or an audio stored in the memory 620 under the control by the processor 610. The audio output unit 770 may include at least one of a speaker 775, a headphone output terminal 772, or a Sony/Philips digital interface (S/PDIF) output terminal 773.

The user interface 780 may receive a user input for controlling the electronic device 700. The user interface 780 may include any of various input devices including, but not limited to, a touch panel for detecting a touch of the user, a button for receiving a push operation of the user, a wheel for receiving a rotation operation of the user, a keyboard, a dome switch, a microphone for voice recognition, and a motion detection sensor for sensing a motion. The user interface 780 may receive a control signal from the control apparatus 210.

Figure 8:
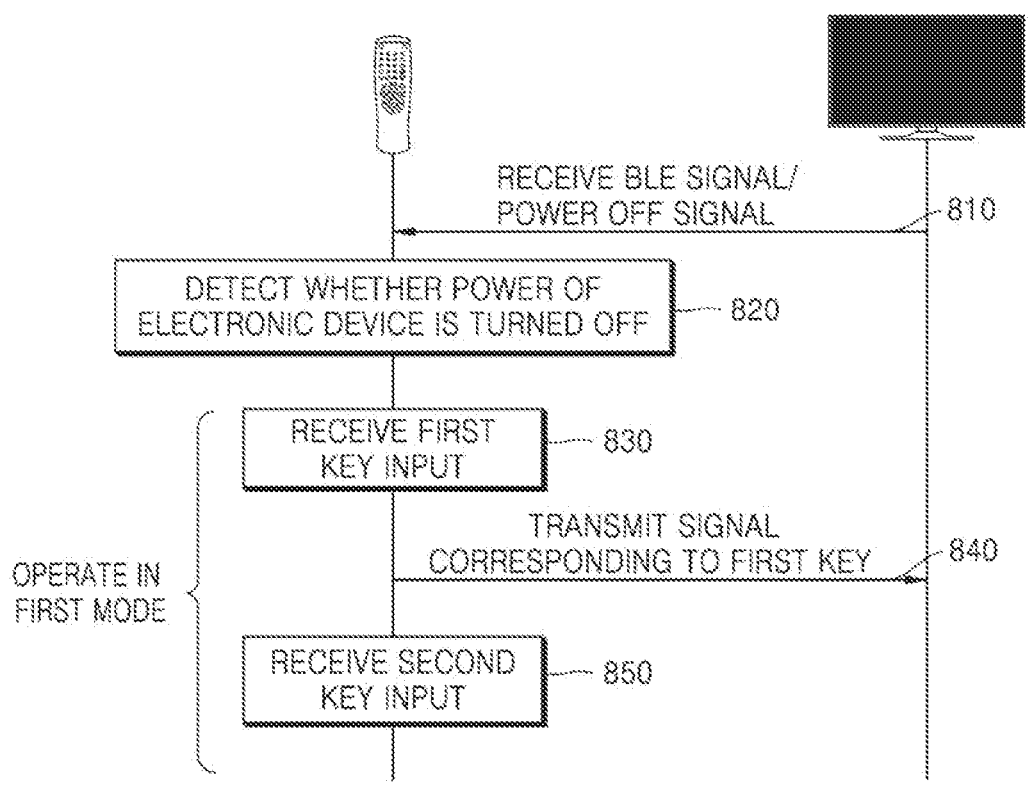
FIG. 8 is a diagram illustrating a method in which a control apparatus operates in a first mode according to an embodiment.

FIG. 8 is a diagram illustrating a method in which a control apparatus operates in a first mode according to an embodiment.

Referring to FIG. 8, a control apparatus may operate in different modes according to whether power of an electronic device is turned on or off.

FIG. 8 will be described assuming that power of the electronic device is turned off.

In an embodiment, a control apparatus may receive a BLE signal from an electronic device (operation 810). The control apparatus may detect that the power of the electronic device is turned off based on a signal received from the electronic device (operation 820). For example, when an interval at which the signal is received from the electronic device is longer than a certain reference value, the control apparatus may detect that the power of the electronic device is turned off. In addition, the control apparatus may detect that the power of the electronic device is turned off by directly receiving a signal indicating power-off from the electronic device.

When the control apparatus detects that the power of the electronic device is turned off, the control apparatus may operate in a first mode. In the first mode, only a first key from among a plurality of keys included in the control apparatus may operate and the remaining keys other than the first key may not operate. In the first mode, the first key may operate in an interrupt method.

When the first key is input from a user (operation 830), the control apparatus may detect an interrupt signal for the first key and may wake up from a sleep mode in response to the interrupt signal. After waking up, the control apparatus may generate a control signal corresponding to the first key, and may transmit the control signal to the electronic device (operation 840).

In an embodiment, after the control apparatus may transmit a signal corresponding to the first key to the electronic device, the control apparatus may operate in the sleep mode again. Even when the first key is input through long-pressing, the control apparatus may wake up only when the control apparatus detects an interrupt signal for the first key, and may operate in the sleep mode in other cases.

When the control apparatus receives an input of a second key, other than the first key, from the user (operation 850), the control apparatus may not recognize the second key input, and may not generate a signal corresponding to the second key input. For example, the control apparatus may not generate a key code instruction according to the second key input, thereby preventing unnecessary power consumption.

Figure 9:
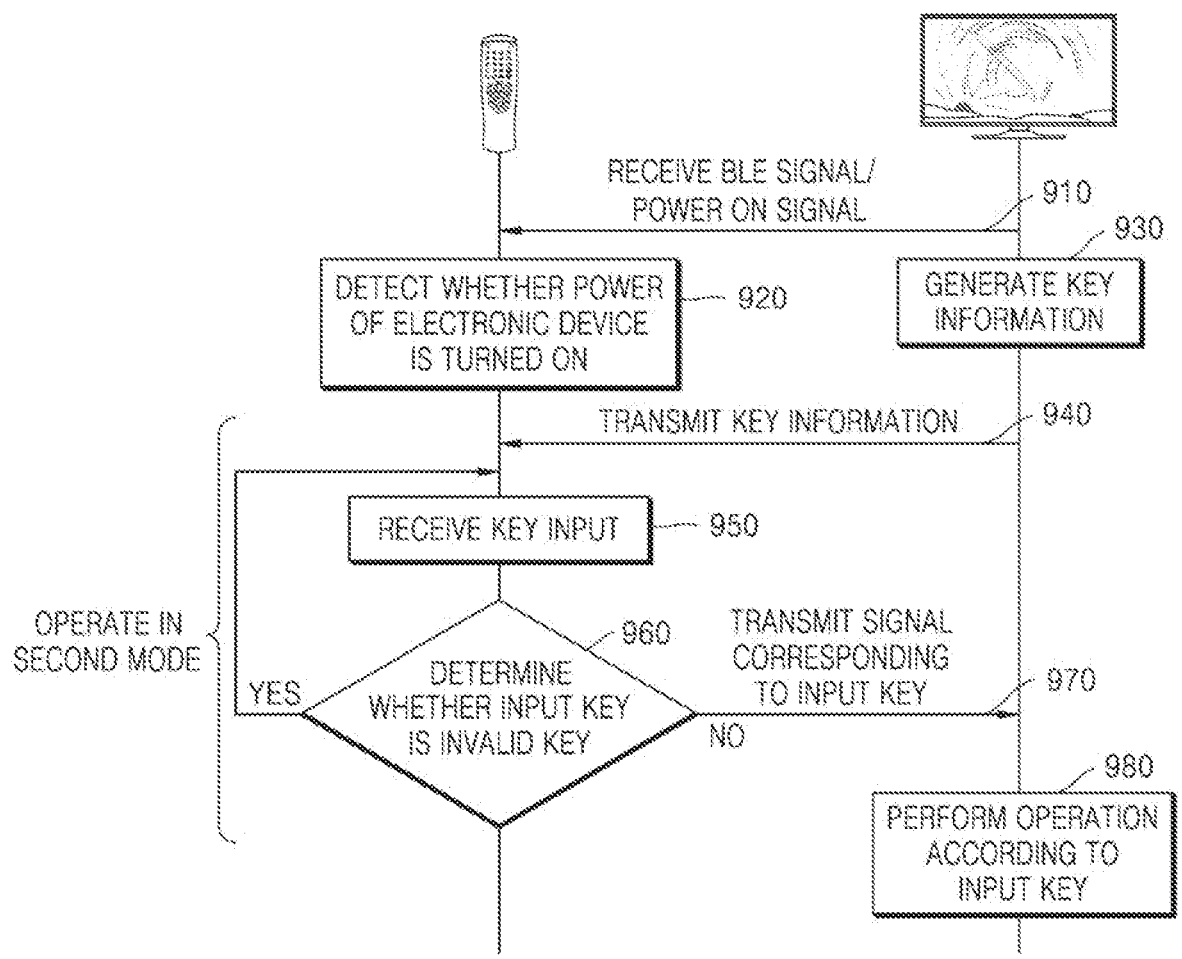
FIG. 9 is a diagram illustrating a method in which a control apparatus operates in a second mode according to an embodiment.

FIG. 9 is a diagram illustrating a method in which a control apparatus operates in a second mode according to an embodiment.

Referring to FIG. 9, a control apparatus may operate in different modes according to whether power of an electronic device is turned on or off.

FIG. 9 will be described assuming that power of the electronic device is turned on.

A control apparatus may receive a signal from an electronic device (operation 910). The control apparatus may detect that the power of the electronic device is turned on based the signal received from the electronic device (operation 920). When an interval at which the signal is received from the electronic device is equal to or shorter than a certain reference value, the control apparatus may detect that the power of the electronic device is turned on. The control apparatus may also detect that the power of the electronic device is turned on, by directly receiving a signal indicating power-on from the electronic device.

When the control apparatus detects that the power of the electronic device is turned on, the control apparatus may operate in a second mode. In the second mode, a plurality of keys included in the control apparatus may operate in a matrix method.

The electronic device may generate key information based on a current state of the electronic device (operation 930). The electronic device may transmit the key information to the control apparatus (operation 940).

When the control apparatus receives the key information from the electronic device and then receives an input of a certain key (operation 950), the control apparatus may determine whether the certain key is an invalid key identified based on the key information (operation 960).

When the certain key is an invalid key, the control apparatus may not transmit a control signal for the certain key to the electronic device.

When the certain key is not an invalid key, the control apparatus may transmit a signal corresponding to the certain key to the electronic device (operation 970). The electronic device may perform an operation according to the control signal received from the control apparatus (operation 980).

Figure 10:
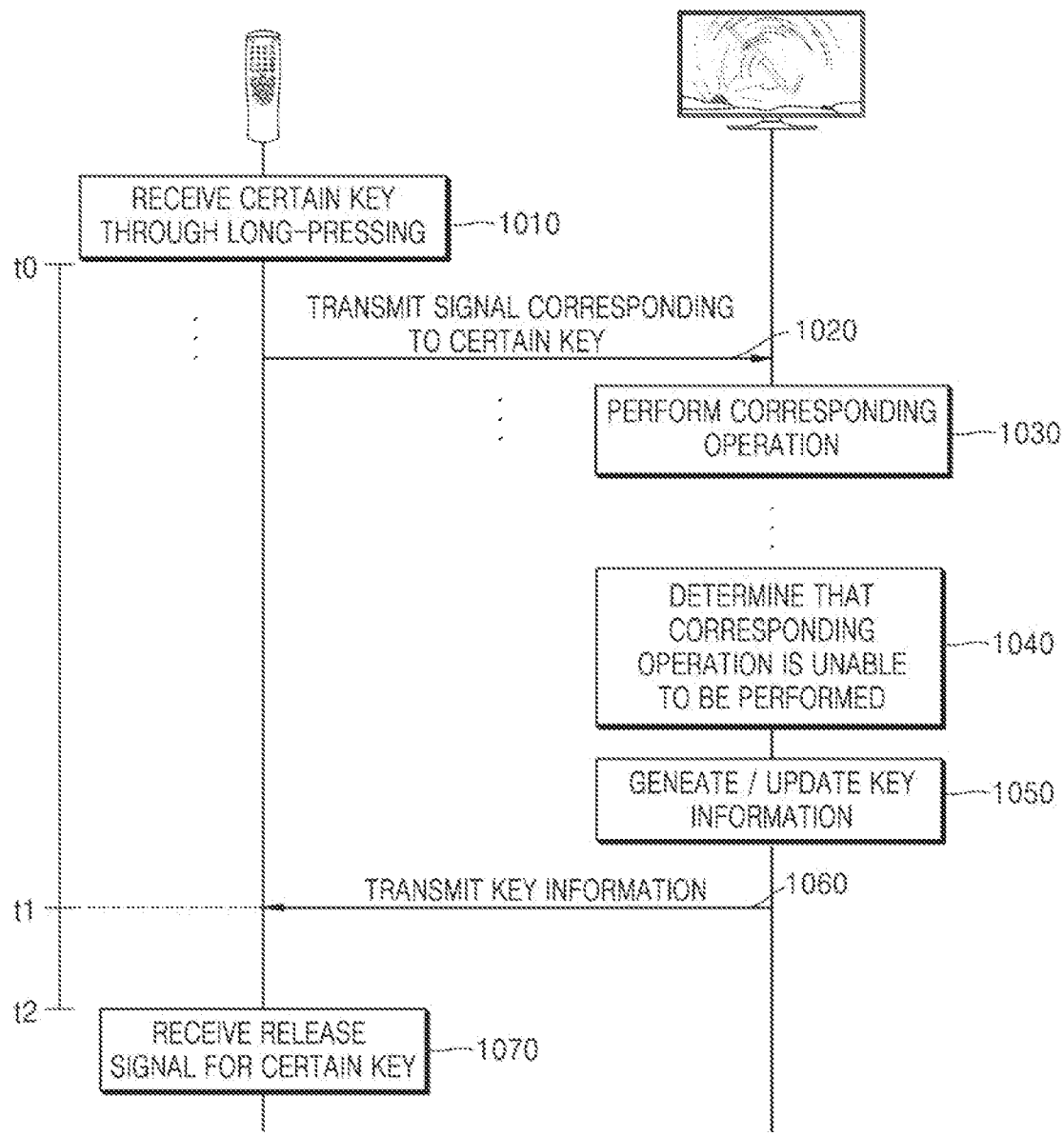
FIG. 10 is a flowchart illustrating an operation in which a control apparatus receives a long-pressed input of a certain key while operating in a second mode according to an embodiment.

FIG. 10 is a flowchart illustrating an operation in which a control apparatus receives a long-pressed input of a certain key while operating in a second mode according to an embodiment.

Referring to FIG. 10, a control apparatus may receive a certain key through long-pressing (operation 1010). In FIG. 10, the control apparatus may receive the certain key through long-pressing from a time t0 to a time t2.

The control apparatus may transmit a signal corresponding to the certain key to an electronic device when the certain key is not an invalid key (operation 1020). The electronic device may receive the signal corresponding to the certain key, and may perform an operation corresponding to the received signal (operation 1030).

When the certain key is input through long-pressing for a certain period of time or more, the control apparatus may continuously transmit the signal corresponding to the certain key to the electronic device. For example, when the certain key is a volume up key and the volume up key is input through long-pressing, the electronic device may continuously perform an operation according to the volume up key.

The electronic device performing the operation corresponding to the certain key may determine that the electronic device may no longer perform the operation (operation 1040). For example, as in the above example, when the electronic device continuously increases a volume value and the volume reaches a maximum value, the electronic device may no longer increase the volume. When the electronic device is no longer able to perform the operation according to the key input, the electronic device may generate key information indicating that the key is an invalid key or may update existing key information (operation 1050).

The electronic device may transmit newly generated or updated key information to the control apparatus (operation 1060).

The control apparatus may receive a release signal for the certain key at the time t2 (operation 1070). The release signal may indicate that an input of the certain key is released.

In an embodiment, even when the certain key is continuously selected after the control apparatus receives the key information from the electronic device, the control apparatus may not transmit a signal according to the key selection to the electronic device. For example, when the control apparatus receives the key information from the electronic device at a time t1 while the certain key is long-pressed, the control apparatus may no longer transmit a signal according to the certain key input to the electronic device from the time t1 to the time t2 when the release signal is received.

Figure 11:
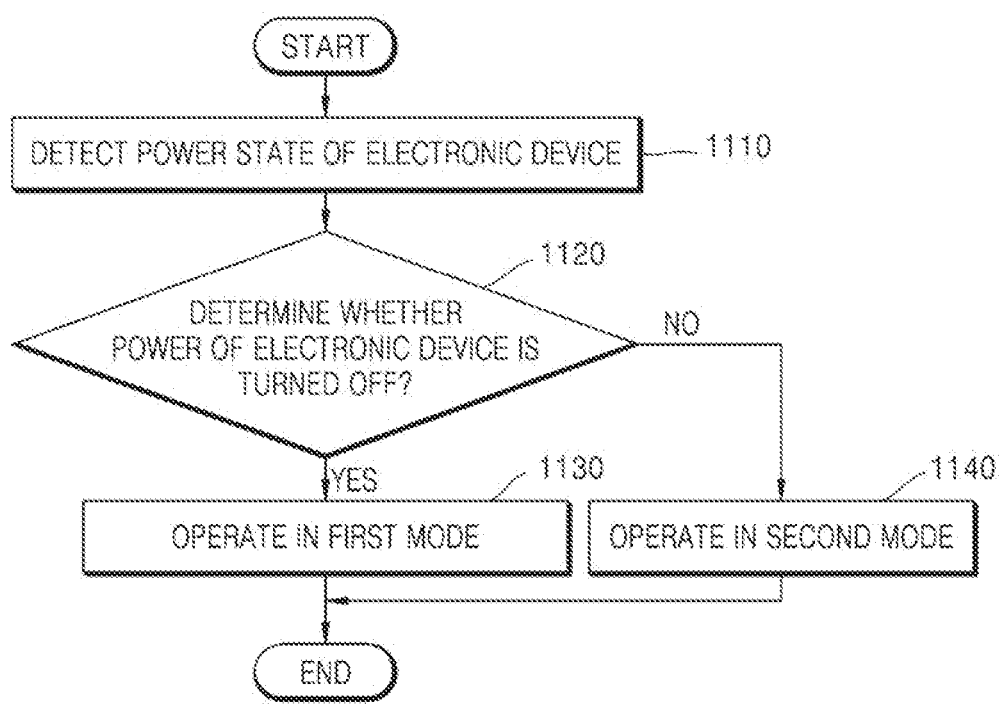
FIG. 11 is a flowchart illustrating an operating method of a control apparatus according to an embodiment.

FIG. 11 is a flowchart illustrating an operating method of a control apparatus according to an embodiment.

Referring to FIG. 11, a control apparatus may detect a power state of an electronic device (operation 1110). The control apparatus may detect the power state of the electronic device based on at least one of using an interval at which a signal is received from the electronic device or receiving a signal indicating the power state of the electronic device from the electronic device.

The control apparatus may determine whether power of the electronic device is turned off by detecting the power state of the electronic device (operation 1120). When power of the electronic device is turned off, the control apparatus may operate in a first mode (operation 1130). The first mode may be referred to as an interrupt mode or an interrupt method.

When power of the electronic device is not turned off, the control apparatus may operate in a second mode (operation 1140). The second mode may be referred to as a scan mode or a matrix method.

Figure 12:
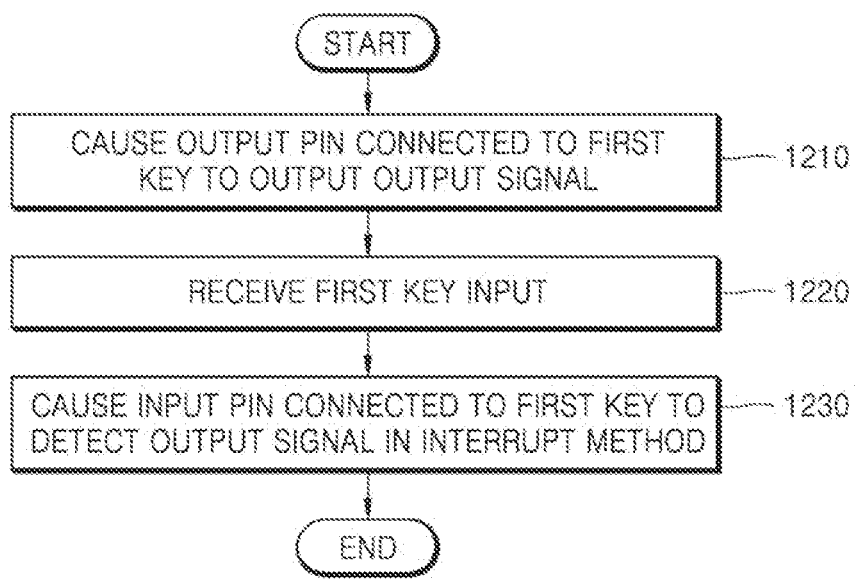
FIG. 12 is a flowchart illustrating that a control apparatus operates in a first mode according to an embodiment.

FIG. 12 is a flowchart illustrating that a control apparatus operates in a first mode according to an embodiment.

Referring to FIG. 12, when power of an electronic device is turned off, a control apparatus may operate in a first mode. The control apparatus may change a pin setting of hardware to the first mode by adjusting a register value of a GPIO pin. In the first mode, only a first key from among keys included in the control apparatus may operate, and second keys other than the first key may not operate.

The control apparatus may control the first key to operate in an interrupt method. To this end, the control apparatus may control only an output pin connected to the first key to output a high signal (operation 1210), and may control current not to flow through output pins connected to keys other than the first key.

The control apparatus may also set only an input pin connected to the first pin to detect an interrupt signal.

When the first key is selected from a user (operation 1220), the input pin connected to the first key may be connected to the output pin connected to the first key, and may detect an output signal in an interrupt method (operation 1230). The control apparatus may generate a key code signal corresponding to the first key in response to the interrupt signal, and may transmit the key code signal to the electronic device.

Figure 13:
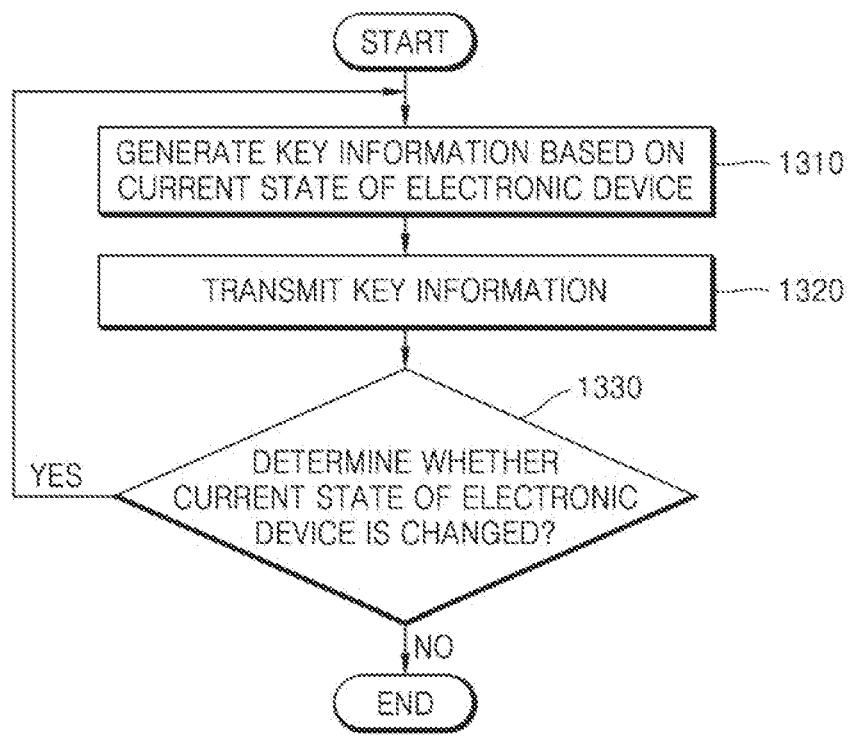
FIG. 13 is a flowchart illustrating that an electronic device generates key information according to an embodiment.

FIG. 13 is a flowchart illustrating that an electronic device generates key information according to an embodiment.

Referring to FIG. 13, an electronic device may generate key information based on a current state of the electronic device (operation 1310). The current state of the electronic device may include at least one of a setting state of the electronic device or a screen state output by the electronic device.

The setting state of the electronic device may include at least one of a source of content output by the electronic device or a function setting state.

The function setting state of the electronic device may include at least one of a volume state, a channel state, or a setting function state of the electronic device.

The screen state output by the electronic device may refer to the number of objects included in a screen or a location state of a currently focused object.

The electronic device may generate the key information indicating an invalid key for which a control signal is received from the control apparatus according to a key input but the electronic device is unable to perform an operation according to the key input, based on the current state.

The electronic device may transmit the key information to the control apparatus (operation 1320). For example, the electronic device may transmit the key information to the control apparatus by using BLE communication.

The electronic device may determine whether the current state of the electronic device is changed (operation 1330). For example, the electronic device may determine whether the setting state of the electronic device is changed or the output screen state of the electronic device is changed.

When the current state of the electronic device is changed, the electronic device may newly generate key information or may update existing key information based on the changed state.

The electronic device may transmit the newly generated key information or the updated key information to the control apparatus again.

A control apparatus and an operating method thereof according to some embodiments may be implemented as a recording medium including instructions executable by a computer such as a program module. A computer-readable medium may be an arbitrary available medium accessible by a computer, and examples thereof include all volatile and non-volatile media and separable and non-separable media. Further, examples of the computer-readable medium may include a computer storage medium and a communication medium. The computer storage medium includes all volatile/nonvolatile and removable/non-removable media embodied by a certain method or technology for storing information such as computer-readable instructions, a data structure, a program module, or other data. The communication medium generally includes a computer-readable instructions, a data structure, a program module, other data of a modulated data signal such as a carrier wave, or another transmission mechanism, and an example thereof includes an arbitrary information transmission medium.

Also, the term "unit" used herein may be a hardware component such as a processor or a circuit and/or a software component executed by a hardware component such as a processor.

A control apparatus and an operating method thereof according to the one or more embodiments may also be implemented as a computer program product including a computer-readable recording medium having embodied thereon a program for executing a method including detecting whether power of an electronic device controlled by a control apparatus is turned off, and operating in a first mode when it is detected that the power of the electronic device is turned off, wherein the operating in the first mode includes causing only a first key from among a plurality of keys included in the control apparatus to operate in an interrupt method and second keys other than the first key not to operate.

While the disclosure has been particularly shown and described with reference to embodiments thereof, it will be understood by one of ordinary skill in the art that various changes in form and details may be made therein without departing from the spirit and scope of the present disclosure as defined by the following claims. Hence, it will be understood that the embodiments should be considered in descriptive sense only and not for purposes of limitation. For example, each component described as a single type may be executed in a distributed manner, and components described as a distributed type may be executed in a combined type.

What is claimed is:

1. A control apparatus for controlling an electronic device comprising:
 a key input interface comprising a plurality of keys;
 a communication interface configured to communicate with the electronic device via a wireless network;
 a memory storing one or more instructions; and
 a processor configured to execute the one or more instructions stored in the memory to:
  detect whether a power of the electronic device is turned on or turned off, and
  control the control apparatus to operate in a first mode, based on detecting that the power of the electronic device is turned off,
 wherein the operating in the first mode comprises operating a first key that is a pre-determined key from among the plurality of keys in an interrupt mode, and not operating a second key other than the first key from among the plurality of keys,
 wherein the processor is further configured to execute the one or more instructions to, through the communication interface, detect that the power of the electronic device is turned off based on detecting that an interval at which a signal is received periodically from the electronic device via the wireless network is longer than a reference value,
 wherein, in the first mode, the processor is further configured to execute the one or more instructions to, based on the first key being long-pressed, transmit the control signal corresponding to the first key to the electronic device once, and then operate in a sleep mode and not transmit the control signal corresponding to the first key to the electronic device again while receiving a continuous long-pressed input for the first key, and
 wherein in the sleep mode the processor does not operate.

2. The control apparatus of claim 1, wherein the operating in the first mode further comprises:
 recognizing a key input of the first key and transmitting a control signal corresponding to the first key to the electronic device based on receiving the key input of the first key; and not recognizing a key input of the second key and not generating a control signal corresponding to the second key based on receiving the key input of the second key.

3. The control apparatus of claim 2, wherein each of the plurality of keys is connected to a line of an input pin and a line of an output pin,
wherein the operating in the first mode further comprises:
controlling the output pin connected to the first key to output an output signal, and the input pin connected to the first key to detect the output signal in the interrupt mode based on receiving the key input of the first key;
controlling the input pin connected to the first key to wake up when the output signal is detected in the interrupt method and to transmit the control signal corresponding to the first key to the electronic device through the communication interface; and
controlling the input pin connected to the first key to operate in a sleep mode while the output signal is not detected in the interrupt method.

4. The control apparatus of claim 3, wherein the processor is further configured to execute the one or more instructions to, based on the first key being long-pressed, transmit the control signal corresponding to the first key to the electronic device once, and then operate in the sleep mode while the first key is long-pressed.

5. The control apparatus of claim 1, wherein the processor is further configured to execute the one or more instructions to, through the communication interface, detect that the power of the electronic device is turned off based on receiving a signal indicating power-off from the electronic device.

6. The control apparatus of claim 1, wherein the first key comprises a power key.

7. The control apparatus of claim 1, wherein the processor is further configured to execute the one or more instructions to control the control apparatus to operate in a second mode based on detecting that the power of the electronic device is turned on,
wherein the operating in the second mode comprises, based on receiving key inputs of the plurality of keys, operating in a matrix method of recognizing the key inputs.

8. The control apparatus of claim 7, wherein the processor is further configured to execute the one or more instructions to, through the communication interface, detect that the power of the electronic device is turned on based on at least one of detecting that an interval at which a signal is received from the electronic device is equal to or shorter than a reference value or receiving a signal indicating power-on from the electronic device.

9. The control apparatus of claim 7, wherein the operating in the second mode further comprises:
controlling the communication interface to receive key information from the electronic device;
based on identifying based on the key information that a key that is input is a key that does not operate, not performing an operation corresponding to the key input; and
based on identifying based on the key information that a key that is input is a key that operates, transmitting a control signal corresponding to the key that is input to the electronic device through the communication interface,
wherein the key information corresponds to a key for which a key input is received from a user from among the plurality of keys.

10. The control apparatus of claim 9, wherein the not performing of the operation based on the key input when based on identifying that the key that is input is the key that does not operate comprises at least one of not generating a control signal corresponding to the key, or not transmitting the control signal corresponding to the key to the electronic device through the communication interface.

11. The control apparatus of claim 9, wherein the key information is determined based on at least one of a setting state of the electronic device or an output screen state output by the electronic device.

12. The control apparatus of claim 9, wherein the processor is further configured to execute the one or more instructions to:
based on a certain key from among the plurality of keys being long-pressed, based on identifying that the certain key is a key that operates, transmit a control signal corresponding to the certain key to the electronic device through the communication interface, and
based on receiving key information indicating that the certain key is a key that does not operate from the electronic device while the certain key is long-pressed, not perform an operation corresponding to an input of the certain key while the certain key is long-pressed.

13. An operating method of a control apparatus, the operating method comprising:
detecting whether a power of an electronic device controlled by the control apparatus is turned on or turned off; and
operating in a first mode based on detecting that the power of the electronic device is turned off,
wherein the operating in the first mode comprises operating a pre-determined first key from among a plurality of keys included in the control apparatus in an interrupt method, and not operating a second key other than the first key from among the plurality of keys,
wherein the detecting that the power of the electronic device is turned off comprises detecting based on an interval at which a signal is received periodically from the electronic device via a wireless network being longer than a reference value, and
wherein the method further comprises, in the first mode, based on the first key being long-pressed, transmitting the control signal corresponding to the first key to the electronic device once, and then operating in a sleep mode without transmitting the control signal corresponding to the first key to the electronic device again even while continuously receiving a long-pressed input for the first key.

14. A non-transitory computer-readable recording medium having recorded thereon a program for executing an operating method of a control apparatus, the operating method comprising:
detecting whether a power of an electronic device controlled by the control apparatus is turned on or turned off; and
operating in a first mode based on detecting that the power of the electronic device is turned off,
wherein the operating in the first mode comprises operating a pre-determined first key from among a plurality of keys included in the control apparatus in an interrupt method, and not operating a second key other than the first key from among the plurality of keys,
wherein the detecting that the power of the electronic device is turned off comprises detecting based on an interval at which a signal is received periodically from the electronic device via a wireless network being longer than a reference value, and wherein the method further comprises, in the first mode, based on the first key being long-pressed, transmitting the control signal corresponding to the first key to the electronic device once, and then operating in a sleep mode without transmitting the control signal corresponding to the first key to the electronic device again even while continuously receiving a long-pressed input for the first key.

15. The operating method of claim 13, wherein the operating in the first mode further comprises:

recognizing a key input of the first key and transmitting a control signal corresponding to the first key to the electronic device based on receiving the key input of the first key; and not recognizing a key input of the second key and not generating a control signal corresponding to the second key based on receiving the key input of the second key.

16. The operating method of claim 15, wherein the operating in the first mode further comprises:

controlling the output pin connected to the first key to output an output signal, and the input pin connected to the first key to detect the output signal in the interrupt mode based on receiving the key input of the first key;

controlling the input pin connected to the first key to wake up when the output signal is detected in the interrupt method and to transmit the control signal corresponding to the first key to the electronic device; and controlling the input pin connected to the first key to operate in a sleep mode while the output signal is not detected in the interrupt method.

17. The operating method claim 13, further comprising operating in a second mode based on detecting that the power of the electronic device is turned on, wherein the operating in the second mode comprises, based on receiving key inputs of the plurality of keys, operating in a matrix method of recognizing the key inputs.

18. The operating method claim of 17, wherein the operating in the second mode further comprises:

controlling the communication interface to receive key information from the electronic device;

based on identifying based on the key information that a key that is input is a key that does not operate, not performing an operation corresponding to the key input; and based on identifying based on the key information that a key that is input is a key that operates, transmitting a control signal corresponding to the key that is input to the electronic device through the communication interface, wherein the key information corresponds to a key for which a key input is received from a user from among the plurality of keys.

19. The operating method of claim 18, wherein the not performing of the operation according to the key input when based on identifying that the key that is input is the key that does not operate comprises at least one of not generating a control signal corresponding to the key, or not transmitting the control signal corresponding to the key to the electronic device through the communication interface.

* * * * *